(12) United States Patent
Kaseyama et al.

(10) Patent No.: US 10,106,701 B2
(45) Date of Patent: Oct. 23, 2018

(54) COMPOSITION FOR FILM FORMATION

(71) Applicant: NISSAN CHEMICAL INDUSTRIES, LTD., Tokyo (JP)

(72) Inventors: Takahiro Kaseyama, Funabashi (JP); Naoya Nishimura, Funabashi (JP); Masaaki Ozawa, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 78 days.

(21) Appl. No.: 15/104,488

(22) PCT Filed: Dec. 17, 2014

(86) PCT No.: PCT/JP2014/083347
§ 371 (c)(1),
(2) Date: Jun. 14, 2016

(87) PCT Pub. No.: WO2015/093508
PCT Pub. Date: Jun. 25, 2015

(65) Prior Publication Data
US 2016/0312062 A1    Oct. 27, 2016

(30) Foreign Application Priority Data
Dec. 17, 2013  (JP) .................. 2013-259733

(51) Int. Cl.
| | | |
|---|---|---|
| *C09D 179/04* | (2006.01) | |
| *C08G 73/00* | (2006.01) | |
| *C09D 5/00* | (2006.01) | |
| *C08G 73/02* | (2006.01) | |
| *C08G 73/06* | (2006.01) | |
| *C09D 7/48* | (2018.01) | |
| *C08K 5/3492* | (2006.01) | |
| *C08K 5/103* | (2006.01) | |
| *C08K 5/3435* | (2006.01) | |

(52) U.S. Cl.
CPC ......... *C09D 179/04* (2013.01); *C08G 73/026* (2013.01); *C08G 73/0273* (2013.01); *C08G 73/065* (2013.01); *C08G 73/0644* (2013.01); *C09D 5/00* (2013.01); *C09D 7/48* (2018.01); *C08K 5/103* (2013.01); *C08K 5/3435* (2013.01); *C08K 5/3492* (2013.01)

(58) Field of Classification Search
CPC ...... C09D 179/04; C09D 7/1241; C09D 5/00; C08G 73/026; C08G 73/0273; C08G 73/0644; C08G 73/065; C08K 5/3492; C08K 5/103; C08K 5/3435
USPC ........................................................ 524/100
See application file for complete search history.

(56) References Cited

U.S. PATENT DOCUMENTS

| | | | |
|---|---|---|---|
| 5,886,130 A | 3/1999 | Trimmer et al. | |
| 8,760,763 B2 | 6/2014 | Takeuchi | |
| 9,434,856 B2* | 9/2016 | Nishimura | C08G 73/0644 |
| 9,618,654 B2* | 4/2017 | Nishimura | H01L 51/5268 |
| 2012/0049308 A1 | 3/2012 | Nishimura et al. | |
| 2013/0281620 A1 | 10/2013 | Nishimura et al. | |
| 2013/0324634 A1 | 12/2013 | Nishimura et al. | |
| 2015/0094420 A1* | 4/2015 | Nishimura | C09D 179/04 |
| | | | 524/612 |
| 2015/0115247 A1* | 4/2015 | Nishimura | G02B 5/0226 |
| | | | 257/40 |

FOREIGN PATENT DOCUMENTS

| | | | |
|---|---|---|---|
| CN | 103429664 A | 12/2013 | |
| JP | 2000-53659 A | 2/2000 | |
| JP | 2001-503077 A | 3/2001 | |
| JP | 2004-156001 A | 6/2004 | |
| JP | 2007-246877 A | 9/2007 | |
| JP | 2008-24832 A | 2/2008 | |
| JP | 2012-92261 A | 5/2012 | |
| JP | 2013-241515 A | 12/2013 | |
| JP | 2013241515 A * | 12/2013 | ............... C08K 3/36 |
| WO | WO 2010/128661 A1 | 11/2010 | |
| WO | WO 2012/029617 A1 | 3/2012 | |
| WO | WO 2012/060286 A1 | 5/2012 | |
| WO | WO 2013/157624 A1 | 10/2013 | |
| WO | WO-2013157624 A1 * | 10/2013 | ............... C09D 4/00 |

(Continued)

OTHER PUBLICATIONS

International Search Report, issued in PCT/JP2014/083347, dated Feb. 10, 2015.

(Continued)

*Primary Examiner* — Michael Bernshteyn
(74) *Attorney, Agent, or Firm* — Birch, Stewart, Kolasch & Birch, LLP

(57) ABSTRACT

With a photocurable composition for film formation which comprises a polymer containing a repeating unit structure having a triazine ring, for example, one represented by the following formula (17), a crosslinking agent, an ultraviolet absorber, and a light stabilizer, it is possible to produce a cured film which has a high refractive index and satisfactory weatherability (17)

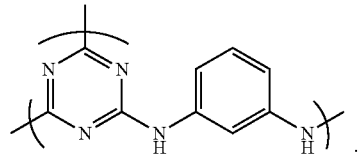

6 Claims, 2 Drawing Sheets

(56) References Cited

FOREIGN PATENT DOCUMENTS

| WO | WO 2013/168787 A1 | 11/2013 | | |
|----|----|----|----|----|
| WO | WO 2013/168788 A1 | 11/2013 | | |
| WO | WO 2013/176279 A1 | 11/2013 | | |
| WO | WO-2013168787 A1 * | 11/2013 | ........... | C09D 179/04 |
| WO | WO-2013168788 A1 * | 11/2013 | ........... | C09D 179/04 |

OTHER PUBLICATIONS

Written Opinion of the International Searching Authority, issued in PCT/JP2014/083347, dated Feb. 10, 2015.
Chinese Office Action and Search Report, dated Jul. 3, 2017, for Chinese Application No. 201480075069.9.

* cited by examiner

COMPOSITION FOR FILM FORMATION

TECHNICAL FIELD

This invention relates to a film-forming composition. More specifically, the invention relates to a film-forming composition which provides a cured film having a high refractive index and good weather resistance.

BACKGROUND ART

Various efforts have hitherto been made to increase the functionality of polymer compounds. For example, in one approach currently used to increase the refractive index of polymer compounds, aromatic rings, halogen atoms or sulfur atoms are introduced onto the compounds. Of such compounds, episulfide polymer compounds and thiourethane polymer compounds, both of which have sulfur atoms introduced thereon, have been commercialized as high-refractive index lenses for eyeglasses.

The most effective way to achieve even higher refractive indices in polymer compounds is known to involve the use of inorganic metal oxides.

For instance, a method for increasing the refractive index by using a hybrid material composed of a siloxane polymer mixed with a material containing small dispersed particles of zirconia, titania or the like has been disclosed (Patent Document 1).

A method in which a condensed ring skeleton having a high refractive index is introduced onto portions of a siloxane polymer has also been disclosed (Patent Document 2).

In addition, numerous attempts have been made to impart heat resistance to polymer compounds. Specifically, it is well known that the heat resistance of polymer compounds can be improved by introducing aromatic rings onto the molecule. For example, polyarylene copolymers with substituted arylene recurring units on the backbone have been disclosed (Patent Document 3). Such polymer compounds show promise primarily in use as heat-resistant plastics.

Melamine resins are familiar as triazine resins, but have very low decomposition temperatures compared with heat-resistant materials such as graphite.

The heat-resistant organic materials composed of carbon and nitrogen that have been used up until now are for the most part aromatic polyimides and aromatic polyamides. However, because these materials have linear structures, their heat-resistance temperatures are not all that high.

Triazine-based condensation materials have also been reported as nitrogen-containing polymer materials having heat resistance (Patent Document 4).

Lately, in the development of electronic devices such as liquid-crystal displays, organic electroluminescence (EL) displays, optical semiconductor (LED) devices, solid-state image sensors, organic thin-film solar cells, dye-sensitized solar cells and organic thin-film transistors (TFTs), there has arisen a need for high-performance polymer materials.

The specific properties desired in such polymer materials include (1) heat resistance, (2) transparency, (3) high refractive index, (4) high solubility, (5) low volume shrinkage, and (6) weather resistance.

The inventors earlier discovered that hyperbranched polymers containing recurring units with a triazine ring and an aromatic ring have a high refractive index, are capable of achieving high heat resistance, high transparency, high refractive index, high solubility and low volume shrinkage with the polymer alone, and are thus suitable as film-forming compositions in the manufacture of electronic devices (Patent Document 5). When cured films produced from such compositions are employed as high-performance films in electronic devices, weather resistance such as stability to ultraviolet light is desired. Yet, there remains room for further improvement in this regard in thin-films obtained from the compositions of Patent Document 5.

PRIOR ART DOCUMENTS

Patent Documents

Patent Document 1: JP-A 2007-246877
Patent Document 2: JP-A 2008-24832
Patent Document 3: U.S. Pat. No. 5,886,130
Patent Document 4: JP-A 2000-53659
Patent Document 5: WO 2010/128661

SUMMARY OF THE INVENTION

Problems to be Solved by the Invention

It is therefore an object of this invention to provide a film-forming composition which includes a triazine ring-containing polymer and provides a thin-film having a high refractive index and good weather resistance.

Means for Solving the Problems

As a result of extensive investigations, the inventors have discovered that a film-forming composition which includes a specific triazine ring-containing polymer, a crosslinking agent, an ultraviolet absorber and a light stabilizer provides a cured film that has good weather resistance while maintaining a high refractive index, and is thus suitable as a functional film that can be used in, for example, electronic devices and is required to have a high refractive index and good weather resistance.

Accordingly, the invention provides:

1. A film-forming composition characterized by comprising a triazine ring-containing polymer which includes a recurring unit structure of formula (1) below

[Chemical Formula 1]

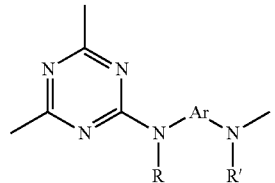

(1)

(wherein R and R' are each independently a hydrogen atom, an alkyl group, an alkoxy group, an aryl group or an aralkyl group; and Ar is at least one moiety selected from the group consisting of moieties of formulas (2) to (13) below

[Chemical Formula 2]

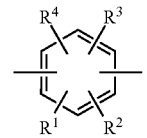

(2)

(3) 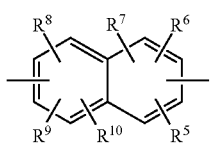

(4) 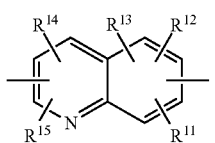

(5) 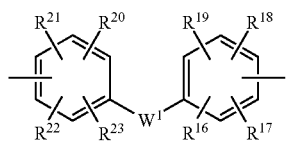

(6) 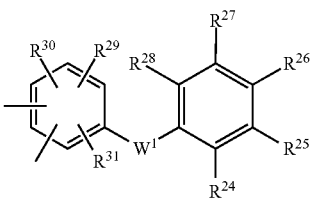

(7) 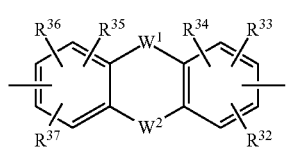

(8) 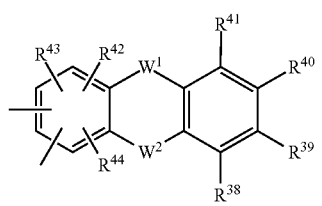

(9) 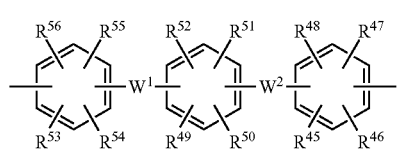

(10) 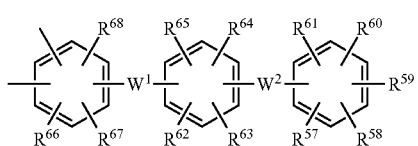

(11) 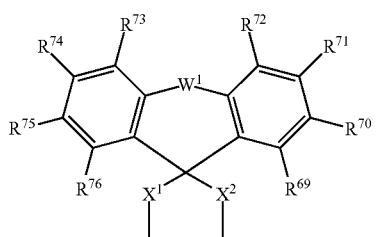

(12) 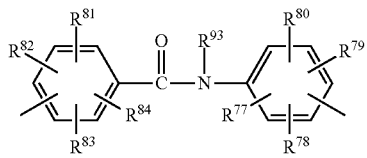

(13) 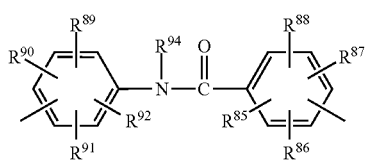

(in which $R^1$ to $R^{92}$ are each independently a hydrogen atom, a halogen atom, a carboxyl group, a sulfo group, an alkyl group of 1 to 10 carbon atoms which may have a branched structure, or an alkoxy group of 1 to 10 carbon atoms which may have a branched structure; $R^{93}$ and $R^{94}$ are hydrogen atoms or alkyl groups of 1 to 10 carbon atoms which may have a branched structure; $W^1$ and $W^2$ are each independently a single bond, $CR^{95}R^{96}$ ($R^{95}$ and $R^{96}$ being each independently a hydrogen atom or an alkyl group of 1 to 10 carbon atoms which may have a branched structure, with the proviso that $R^{95}$ and $R^{96}$ may together form a ring), C=O, O, S, SO, $SO_2$ or $NR^{97}$ ($R^{97}$ being a hydrogen atom or an alkyl group of 1 to 10 carbon atoms which may have a branched structure); and $X^1$ and $X^2$ are each independently a single bond, an alkylene group of 1 to 10 carbon atoms which may have a branched structure, or a group of formula (14) below

[Chemical Formula 3]

(14) 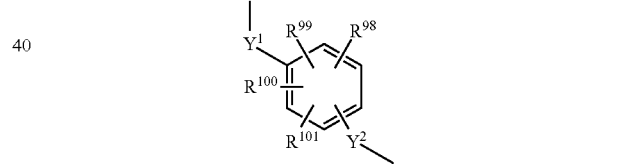

($R^{96}$ to $R^{101}$ being each independently a hydrogen atom, a halogen atom, a carboxyl group, a sulfo group, an alkyl group of 1 to 10 carbon atoms which may have a branched structure, or an alkoxy group of 1 to 10 carbon atoms which may have a branched structure; and $Y^1$ and $Y^2$ being each independently a single bond or an alkylene group of 1 to 10 carbon atoms which may have a branched structure))), a crosslinking agent, an ultraviolet absorber and a light stabilizer;

2. The film-forming composition of 1 above, wherein the ultraviolet absorber and the light stabilizer are included in a weight ratio, expressed as light stabilizer/UV absorber, of from 50/50 to 80/20;

3. The film-forming composition of 1 or 2 above, wherein the ultraviolet absorber is a triazine or benzotriazole-type ultraviolet absorber;

4. The film-forming composition of 3 above, wherein the ultraviolet absorber is a triazine-type ultraviolet absorber;

5. The film-forming composition of any one of 1 to 4 above, wherein the light stabilizer is a hindered amine-type light stabilizer;

6. A cured film obtained by curing the film-forming composition of any one of 1 to 5 above;
7. An electronic device comprising a substrate and the cured film of 6 above formed on the substrate; and
8. A weather-resistant film comprising a substrate and the cured film of 6 above formed on the substrate.

Advantageous Effects of the Invention

The film-forming composition of the invention includes a specific triazine ring-containing polymer (hyperbranched polymer), a crosslinking agent, an ultraviolet absorber and a light stabilizer. Hence, by using this composition, a cured film can be obtained which, in addition to having the characteristics of a high heat resistance, high transparency, high refraction index, high solubility and low volume shrinkage, also has good weather resistance.

The inventive film having such properties can be advantageously used as a component in the manufacture of electronic devices such as liquid-crystal displays, organic electroluminescence (EL) displays, touch panels, optical semiconductor (LED) devices, solid-state image sensors, organic thin-film solar cells, dye-sensitized solar cells and organic thin-film transistors (TFTs). In particular, such a film can be effectively used as a refractive index adjusting layer for use as a lens component or electronic component required to have weather resistance. Such a film can also be effectively used as a refractive index adjusting layer in organic EL displays, LEDs and touch panels required to have a high refractive index.

In addition, use is also possible in various fields that require, as a high-performance film having a high refractive index and weather resistance, a film endowed with such properties.

BRIEF DESCRIPTION OF THE DIAGRAMS

EMBODIMENT FOR CARRYING OUT THE INVENTION

Figure 1:
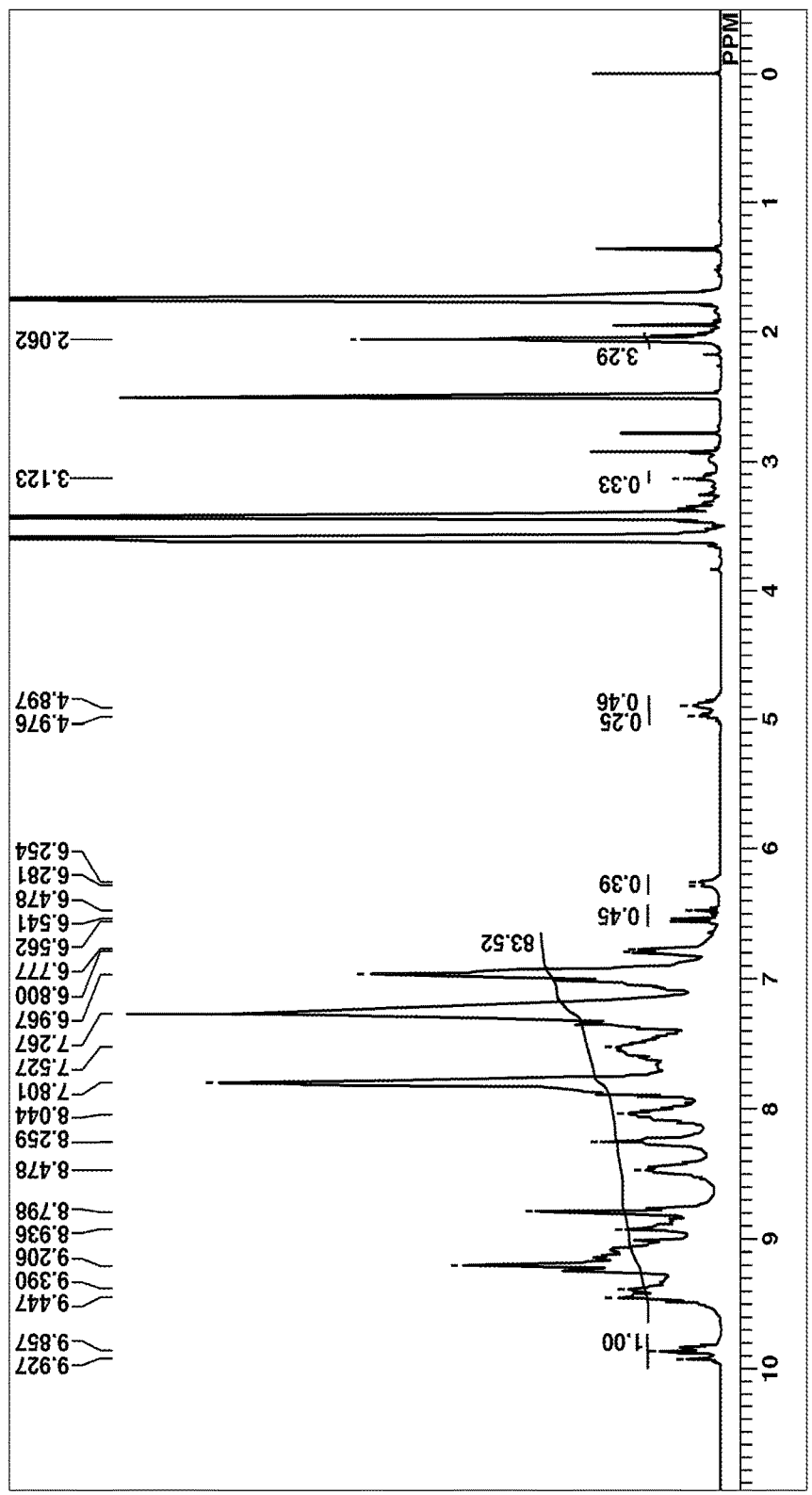
FIG. 1 is an $^1$H-NMR spectrum of Polymer Compound [3] obtained in Synthesis Example 1.

The invention is described more fully below.
The film-forming composition of the invention contains a triazine ring-containing polymer which includes a recurring unit structure of formula (1) below, a crosslinking agent, an ultraviolet absorber and a light stabilizer.

[Chemical Formula 4]

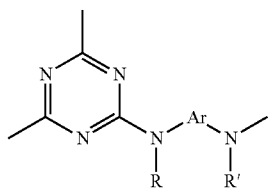

(1)

In the above formula, R and R' are each independently a hydrogen atom, an alkyl group, an alkoxy group, an aryl group or an aralkyl group.

In this invention, the number of carbon atoms on the alkyl group, although not particularly limited, is preferably from 1 to 20. To further increase the heat resistance of the polymer, the number of carbon atoms is more preferably from 1 to 10, and even more preferably from 1 to 3. The alkyl group may have a linear, branched or cyclic structure.

Illustrative examples of the alkyl group include methyl, ethyl, n-propyl, isopropyl, cyclopropyl, n-butyl, isobutyl, s-butyl, t-butyl, cyclobutyl, 1-methylcyclopropyl, 2-methylcyclopropyl, n-pentyl, 1-methyl-n-butyl, 2-methyl-n-butyl, 3-methyl-n-butyl, 1,1-dimethyl-n-propyl, 1,2-dimethyl-n-propyl, 2,2-dimethyl-n-propyl, 1-ethyl-n-propyl, cyclopentyl, 1-methylcyclobutyl, 2-methylcyclobutyl, 3-methylcyclobutyl, 1,2-dimethylcyclopropyl, 2,3-dimethylcyclopropyl, 1-ethylcyclopropyl, 2-ethylcyclopropyl, n-hexyl, 1-methyl-n-pentyl, 2-methyl-n-pentyl, 3-methyl-n-pentyl, 4-methyl-n-pentyl, 1,1-dimethyl-n-butyl, 1,2-dimethyl-n-butyl, 1,3-dimethyl-n-butyl, 2,2-dimethyl-n-butyl, 2,3-dimethyl-n-butyl, 3,3-dimethyl-n-butyl, 1-ethyl-n-butyl, 2-ethyl-n-butyl, 1,1,2-trimethyl-n-propyl, 1,2,2-trimethyl-n-propyl, 1-ethyl-1-methyl-n-propyl, 1-ethyl-2-methyl-n-propyl, cyclohexyl, 1-methylcyclopentyl, 2-methylcyclopentyl, 3-methylcyclopentyl, 1-ethylcyclobutyl, 2-ethylcyclobutyl, 3-ethylcyclobutyl, 1,2-dimethylcyclobutyl, 1,3-dimethylcyclobutyl, 2,2-dimethylcyclobutyl, 2,3-dimethylcyclobutyl, 2,4-dimethylcyclobutyl, 3,3-dimethylcyclobutyl, 1-n-propylcyclopropyl, 2-n-propylcyclopropyl, 1-isopropylcyclopropyl, 2-isopropylcyclopropyl, 1,2,2-trimethylcyclopropyl, 1,2,3-trimethylcyclopropyl, 2,2,3-trimethylcyclopropyl, 1-ethyl-2-methylcyclopropyl, 2-ethyl-1-methylcyclopropyl, 2-ethyl-2-methylcyclopropyl and 2-ethyl-3-methylcyclopropyl groups.

The number of carbon atoms on the alkoxy group, although not particularly limited, is preferably from 1 to 20. To further increase the heat resistance of the polymer, the number of carbon atoms is more preferably from 1 to 10, and even more preferably from 1 to 3. The alkyl moiety thereon may have a linear, branched or cyclic structure.

Illustrative examples of the alkoxy group include methoxy, ethoxy, n-propoxy, isopropoxy, n-butoxy, isobutoxy, s-butoxy, t-butoxy, n-pentoxy, 1-methyl-n-butoxy, 2-methyl-n-butoxy, 3-methyl-n-butoxy, 1,1-dimethyl-n-propoxy, 1,2-dimethyl-n-propoxy, 2,2-dimethyl-n-propoxy, 1-ethyl-n-propoxy, n-hexyloxy, 1-methyl-n-pentyloxy, 2-methyl-n-pentyloxy, 3-methyl-n-pentyloxy, 4-methyl-n-pentyloxy, 1,1-dimethyl-n-butoxy, 1,2-dimethyl-n-butoxy, 1,3-dimethyl-n-butoxy, 2,2-dimethyl-n-butoxy, 2,3-dimethyl-n-butoxy, 3,3-dimethyl-n-butoxy, 1-ethyl-n-butoxy, 2-ethyl-n-butoxy, 1,1,2-trimethyl-n-propoxy, 1,2,2-trimethyl-n-propoxy, 1-ethyl-1-methyl-n-propoxy and 1-ethyl-2-methyl-n-propoxy groups.

The number of carbon atoms on the aryl group, although not particularly limited, is preferably from 6 to 40. To further increase the heat resistance of the polymer, the number of carbon atoms is more preferably from 6 to 16, and even more preferably from 6 to 13.

Illustrative examples of the aryl group include phenyl, o-chlorophenyl, m-chlorophenyl, p-chlorophenyl, o-fluorophenyl, p-fluorophenyl, o-methoxyphenyl, p-methoxyphenyl, p-nitrophenyl, p-cyanophenyl, α-naphthyl, β-naphthyl, o-biphenylyl, m-biphenylyl, p-biphenylyl, 1-anthryl, 2-anthryl, 9-anthryl, 1-phenanthryl, 2-phenanthryl, 3-phenanthryl, 4-phenanthryl and 9-phenanthryl groups.

The number of carbon atoms on the aralkyl group, although not particularly limited, is preferably from 7 to 20. The alkyl moiety thereon may be linear, branched or cyclic.

Illustrative examples of the aralkyl group include benzyl, p-methylphenylmethyl, m-methylphenylmethyl, o-ethylphenylmethyl, m-ethylphenylmethyl, p-ethylphenylmethyl, 2-propylphenylmethyl, 4-isopropylphenylmethyl, 4-isobutylphenylmethyl and α-naphthylmethyl groups.

In the above formula, Ar is at least one moiety selected from among those of formulas (2) to (13) below.

[Chemical Formula 5]

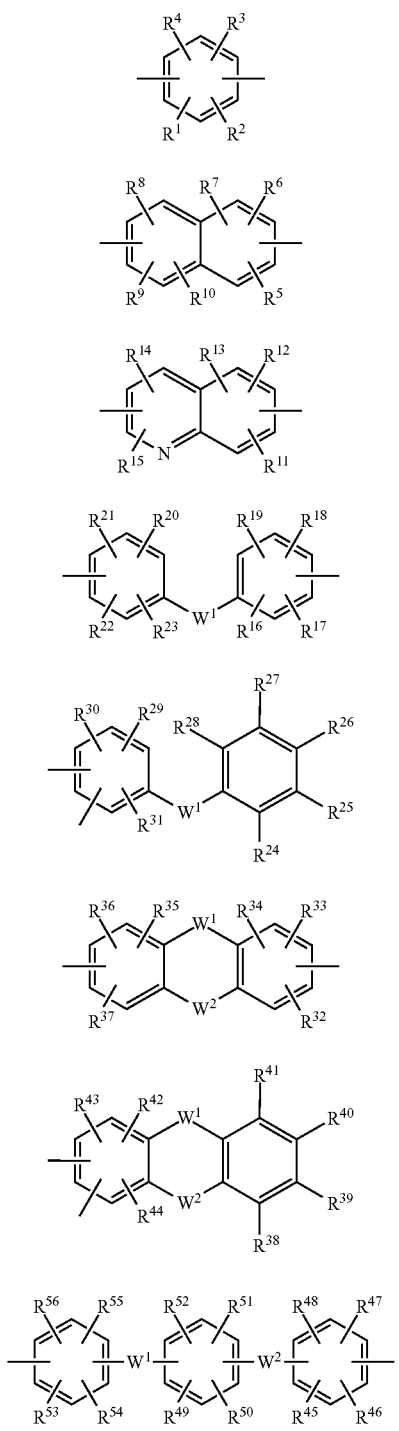

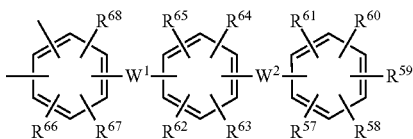

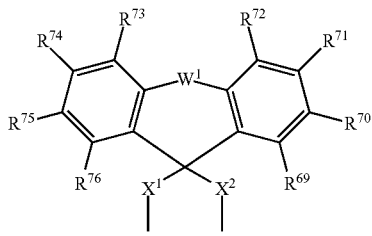

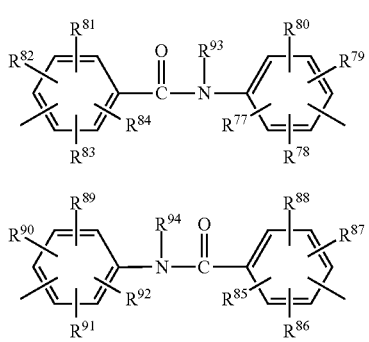

In the above formulas, $R^1$ to $R^{92}$ are each independently a hydrogen atom, a halogen atom, a carboxyl group, a sulfo group, an alkyl group of 1 to 10 carbon atoms which may have a branched structure, or an alkoxy group of 1 to 10 carbon atoms which may have a branched structure. $W^1$ and $W^2$ are each independently a single bond, $CR^{95}R^{96}$ (wherein $R^{95}$ and $R^{96}$ are each independently a hydrogen atom or an alkyl group of 1 to 10 carbon atoms which may have a branched structure, with the proviso that $R^{95}$ and $R^{96}$ may together form a ring), $C=O$, $O$, $S$, $SO$, $SO_2$ or $NR^{97}$ (wherein $R^{97}$ is a hydrogen atom or an alkyl group of 1 to 10 carbon atoms which may have a branched structure). $R^{93}$ and $R^{94}$ are hydrogen atoms or alkyl groups of 1 to 10 carbon atoms which may have a branched structure.

Examples of halogen atoms include fluorine, chlorine, bromine and iodine.

These alkyl groups and alkoxy groups are exemplified by the same groups as mentioned above.

$X^1$ and $X^2$ are each independently a single bond, an alkylene group of 1 to 10 carbon atoms which may have a branched structure, or a group of formula (14) below.

[Chemical Formula 6]

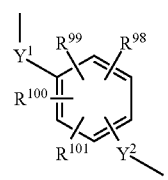

In the above formula, $R^{98}$ to $R^{101}$ are each independently a hydrogen atom, a halogen atom, a carboxyl group, a sulfo group, an alkyl group of 1 to 10 carbon atoms which may have a branched structure, or an alkoxy group of 1 to 10 carbon atoms which may have a branched structure. $Y^1$ and $Y^2$ are each independently a single bond or an alkylene group of 1 to 10 carbon atoms which may have a branched structure. These halogen atoms, alkyl groups and alkoxy groups are exemplified by the same groups as mentioned above.

Illustrative examples of the alkylene group of 1 to 10 carbon atoms which may have a branched structure include methylene, ethylene, propylene, trimethylene, tetramethylene and pentamethylene groups.

In particular, Ar is preferably at least one moiety selected from among moieties of formulas (2) and (5) to (13), and more preferably at least one moiety selected from among moieties of formulas (2), (5), (7), (8) and (11) to (13). Illustrative examples of aryl groups of formulas (2) to (13) include, but are not limited to, those having the following formulas.

[Chemical Formula 7]

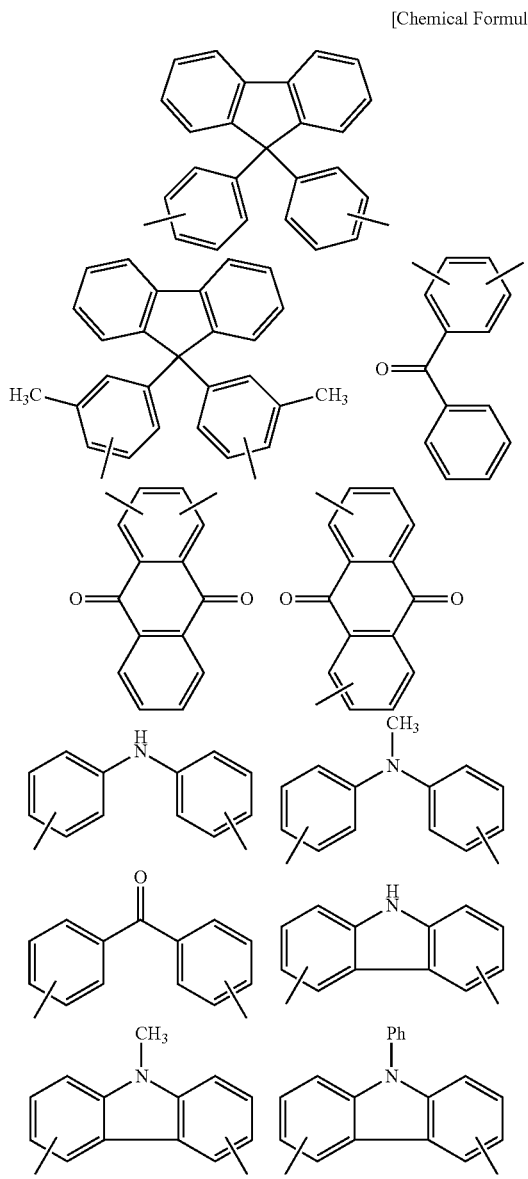

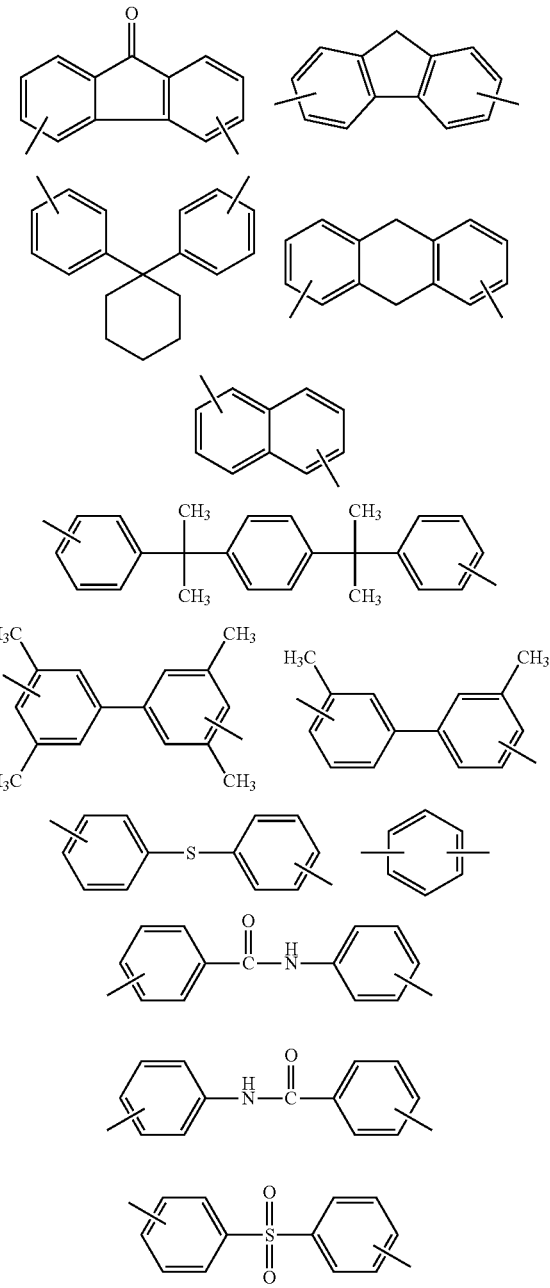

Of these, to obtain a polymer having a higher refractive index, aryl groups of the following formulas are more preferred.

[Chemical Formula 8]

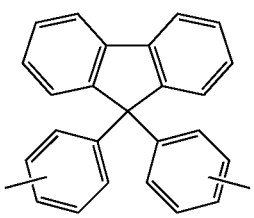

-continued

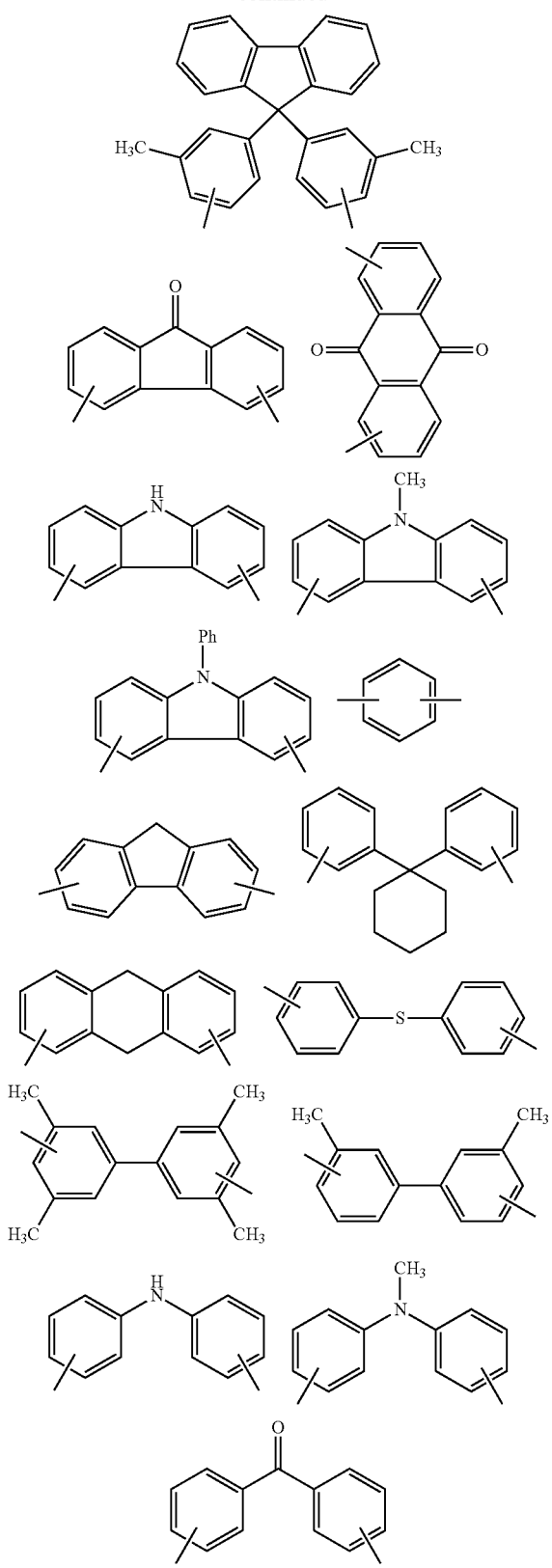

To further increase the solubility in very safe solvents such as resist solvents, it is preferable to include a recurring unit structure of formula (15) below.

[Chemical Formula 9]

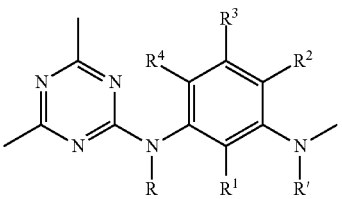

(15)

In this formula, R, R' and $R^1$ to $R^4$ are as defined above.

From such a standpoint, especially preferred recurring unit structures include those of formula (16) below, with hyperbranched polymers of formula (17) below being most preferred.

[Chemical Formula 10]

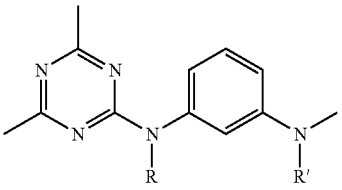

(16)

In this formula, R and R' are as defined above.

[Chemical Formula 11]

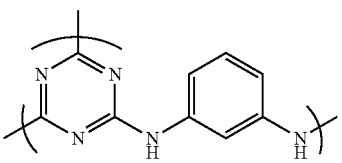

(17)

The polymer in this invention has a weight-average molecular weight which, although not particularly limited, is preferably between 500 and 500,000, and more preferably between 500 and 100,000. To further enhance the heat resistance and lower the shrinkage ratio, the weight-average molecular weight is preferably at least 2,000. To further increase the solubility and lower the viscosity of the resulting solution, the weight-average molecular weight is preferably not more than 50,000, more preferably not more than 30,000, and even more preferably not more than 10,000.

The weight-average molecular weight in the invention is the weight-average molecular weight measured by gel permeation chromatography (GPC) against a polystyrene standard.

The triazine ring-containing polymer in this invention may be prepared by the method disclosed in above-cited Patent Document 5.

For example, as shown in Scheme 1 below, a hyperbranched polymer having the recurring structure (17') can be obtained by reacting a cyanuric halide (18) with an m-phenylenediamine compound (19) in a suitable organic solvent.

Scheme 1

[Chemical Formula 12]

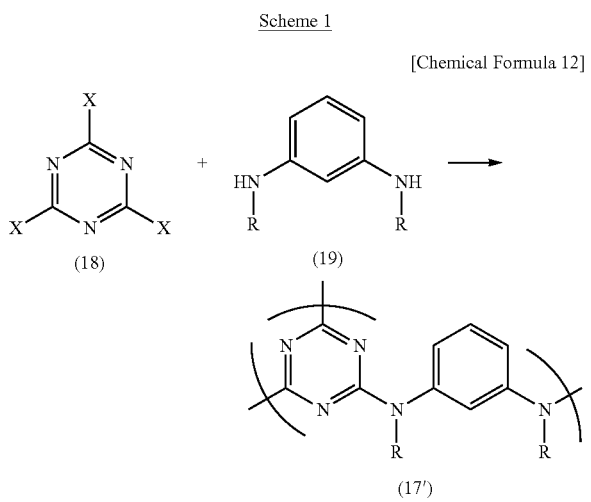

In the above formula, each X is independently a halogen atom. R is as defined above.

As shown in Scheme 2 below, a hyperbranched polymer having the recurring structure (17') can be synthesized from a compound (20) obtained by reacting equimolar amounts of a cyanuric halide (18) and an m-phenylenediamine compound (19) in a suitable organic solvent.

Scheme 2

[Chemical Formula 13]

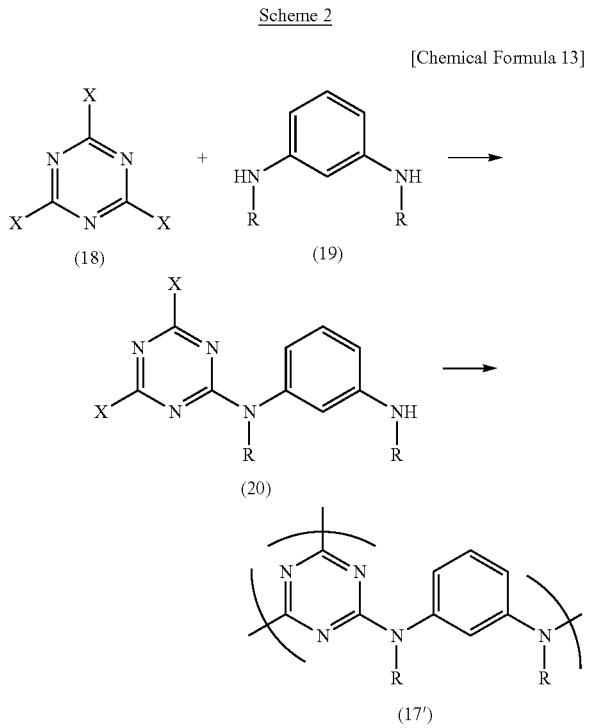

In the above formula, each X is independently a halogen atom. R is as defined above.

In the methods of Schemes 1 and 2, the respective starting materials may be charged in any suitable amounts so long as the target polymer is obtained, although the use of from 0.01 to 10 equivalents of the diamine compound (19) per equivalent of the cyanuric halide (18) is preferred.

In the method of Scheme 1 in particular, it is preferable to avoid using 3 equivalents of the diamine compound (19) per 2 equivalents of the cyanuric halide (18). By including the respective functional groups in amounts that are not chemically equivalent, the formation of a gel can be prevented.

To obtain hyperbranched polymers of various molecular weights which have many terminal triazine rings, it is preferable to use the diamine compound (19) in an amount of less than 3 equivalents per 2 equivalents of the cyanuric halide (18).

On the other hand, to obtain hyperbranched polymers of various molecular weights which have many terminal amines, it is preferable to use the cyanuric halide (18) in an amount of less than 2 equivalents per 3 equivalents of the diamine compound (19).

For example, in cases where a thin film has been produced, in order for the film to have an excellent transparency and light resistance, a hyperbranched polymer having many terminal triazine rings is preferred.

Various solvents that are commonly used in this type of reaction may be used as the organic solvent. Illustrative examples include tetrahydrofuran, dioxane, dimethylsulfoxide; amide solvents such as N,N-dimethylformamide, N-methyl-2-pryrrolidone, tetramethylurea, hexamethylphosphoramide, N,N-dimethylacetamide, N-methyl-2-piperidone, N,N-dimethylethyleneurea, N,N,N',N'-tetramethylmalonamide, N-methylcaprolactam, N-acetylpyrrolidine, N,N-diethylacetamide, N-ethyl-2-pyrrolidone, N,N-dimethylpropionamide, N,N-dimethylisobutyramide, N-methylformamide and N,N'-dimethylpropyleneurea; and mixed solvents thereof.

Of the above, N,N-dimethylformamide, dimethylsulfoxide, N-methyl-2-pyrrolidone, N,N-dimethylacetamide, and mixed solvents thereof are preferred. N,N-Dimethylacetamide and N-methyl-2-pyrrolidone are especially preferred.

In the Scheme 1 reaction and the second stage reaction in Scheme 2, the reaction temperature may be suitably set in the range from the melting point to the boiling point of the solvent used, although the temperature is preferably from about 0° C. to about 150° C., and more preferably from 60° C. to 100° C.

In the Scheme 1 reaction in particular, to suppress linearity and increase the degree of branching, the reaction temperature is preferably from 60° C. to 150° C., more preferably from 80° C. to 150° C., and even more preferably from 80° C. to 120° C.

In the first stage reaction of Scheme 2, the reaction temperature may be suitably set in the range from the melting point to the boiling point of the solvent used, with a temperature of from about −50° C. to about 50° C. being preferred, a temperature of from about −20° C. to about 50° C. being more preferred, a temperature of from about −10° C. to about 50° C. being even more preferred, and a temperature of from −10° C. to 10° C. being still more preferred.

In the Scheme 2 method in particular, the use of a two-stage process consisting of a first step involving reaction at from −50° C. to 50° C., followed by a second step involving reaction at from 60° C. to 150° C. is preferred.

In each of the above reactions, the ingredients may be added in any order. However, in the Scheme 1 reaction, the best method is to heat a solution containing either the cyanuric halide (18) or the diamine compound (19) and the organic solvent to a temperature of from 60° C. to 150° C., and preferably from 80° C. to 150° C., then add the remaining ingredient—the diamine compound (19) or the cyanuric halide (18)—to the resulting solution at this temperature.

In this case, either ingredient may be used as the ingredient which is initially dissolved in the solvent or as the ingredient which is subsequently added, although a method wherein the cyanuric halide (18) is added to a heated solution of the diamine compound (19) is preferred.

In the Scheme 2 reactions, either ingredient may be used as the ingredient which is initially dissolved in the solvent or as the ingredient which is subsequently added, although a method wherein the diamine compound (19) is added to a cooled solution of the cyanuric halide (18) is preferred.

The subsequently added ingredient may be added neat or may be added as a solution of the ingredient dissolved in an organic solvent such as any of those mentioned above. However, taking into account the ease of operation and the controllability of the reaction, the latter approach is preferred.

Also, addition may be carried out gradually such as in a dropwise manner, or the entire amount may be added all at once in a batchwise manner.

In Scheme 1, even when the reaction is carried out in a single stage after both compounds have been mixed together in a heated state (that is, without raising the temperature in a stepwise fashion), the target triazine ring-containing hyperbranched polymer can be obtained without gelation.

In the Scheme 1 reaction and the second stage reaction in Scheme 2, various bases which are commonly used during or after polymerization may be added.

Illustrative examples of such bases include potassium carbonate, potassium hydroxide, sodium carbonate, sodium hydroxide, sodium bicarbonate, sodium ethoxide, sodium acetate, lithium carbonate, lithium hydroxide, lithium oxide, potassium acetate, magnesium oxide, calcium oxide, barium hydroxide, trilithium phosphate, trisodium phosphate, tripotassium phosphate, cesium fluoride, aluminum oxide, ammonia, trimethylamine, triethylamine, diisopropylamine, diisopropylethylamine, N-methylpiperidine, 2,2,6,6-tetramethyl-N-methylpiperidine, pyridine, 4-dimethylaminopyridine and N-methylmorpholine.

The amount of base added per equivalent of the cyanuric halide (18) is preferably from 1 to 100 equivalents, and more preferably from 1 to 10 equivalents. These bases may be used in the form of an aqueous solution.

In the methods of both schemes, following reaction completion, the product can be easily purified by a suitable technique such as reprecipitation.

Also, in the present invention, some portion of the halogen atoms on at least one terminal triazine ring may be capped with, for example, alkyl, aralkyl, aryl, alkylamino, alkoxysilyl-containing alkylamino, aralkylamino, arylamino, alkoxy, aralkyloxy, aryloxy or ester groups.

Of these, alkylamino, alkoxysilyl-containing alkylamino, aralkylamino and arylamino groups are preferred. Alkylamino and arylamino groups are more preferred. Arylamino groups are even more preferred.

The above alkyl groups and alkoxy groups are exemplified in the same way as described earlier in the specification.

Illustrative examples of ester groups include methoxycarbonyl and ethoxycarbonyl groups.

Illustrative examples of aryl groups include phenyl, o-chlorophenyl, m-chlorophenyl, p-chlorophenyl, o-fluorophenyl, p-fluorophenyl, o-methoxyphenyl, p-methoxyphenyl, p-nitrophenyl, p-cyanophenyl, α-naphthyl, β-naphthyl, o-biphenylyl, m-biphenylyl, p-biphenylyl, 1-anthryl, 2-anthryl, 9-anthryl, 1-phenanthryl, 2-phenanthryl, 3-phenanthryl, 4-phenanthryl and 9-phenanthryl groups.

Illustrative examples of aralkyl groups include benzyl, p-methylphenylmethyl, m-methylphenylmethyl, o-ethylphenylmethyl, m-ethylphenylmethyl, p-ethylphenylmethyl, 2-propylphenylmethyl, 4-isopropylphenylmethyl, 4-isobutylphenylmethyl and α-naphthylmethyl groups.

Illustrative examples of alkylamino groups include methylamino, ethylamino, n-propylamino, isopropylamino, n-butylamino, isobutylamino, s-butylamino, t-butylamino, n-pentylamino, 1-methyl-n-butylamino, 2-methyl-n-butylamino, 3-methyl-n-butylamino, 1,1-dimethyl-n-propylamino, 1,2-dimethyl-n-propylamino, 2,2-dimethyl-n-propylamino, 1-ethyl-n-propylamino, n-hexylamino, 1-methyl-n-pentylamino, 2-methyl-n-pentylamino, 3-methyl-n-pentylamino, 4-methyl-n-pentylamino, 1,1-dimethyl-n-butylamino, 1,2-dimethyl-n-butylamino, 1,3-dimethyl-n-butylamino, 2,2-dimethyl-n-butylamino, 2,3-dimethyl-n-butylamino, 3,3-dimethyl-n-butylamino, 1-ethyl-n-butylamino, 2-ethyl-n-butylamino, 1,1,2-trimethyl-n-propylamino, 1,2,2-trimethyl-n-propylamino, 1-ethyl-1-methyl-n-propylamino and 1-ethyl-2-methyl-n-propylamino groups.

Illustrative examples of aralkylamino groups include benzylamino, methoxycarbonylphenylmethylamino, ethoxycarbonylphenylmethylamino, p-methylphenylmethylamino, m-methylphenylmethylamino, o-ethylphenylmethylamino, m-ethylphenylmethylamino, p-ethylphenylmethylamino, 2-propylphenylmethylamino, 4-isopropylphenylmethylamino, 4-isobutylphenylmethylamino, naphthylmethylamino, methoxycarbonylnaphthylmethylamino and ethoxycarbonylnaphthylmethylamino groups.

Illustrative examples of arylamino groups include phenylamino, methoxycarbonylphenylamino, ethoxycarbonylphenylamino, naphthylamino, methoxycarbonylnaphthylamino, ethoxycarbonylnaphthylamino, anthranylamino, pyrenylamino, biphenylamino, terphenylamino and fluorenylamino groups.

Alkoxysilyl-containing alkylamino groups are exemplified by monoalkoxysilyl-containing alkylamino groups, dialkoxysilyl-containing alkylamino groups and trialkoxysilyl-containing alkylamino groups. Illustrative examples include 3-trimethoxysilylpropylamino, 3-triethoxysilylpropylamino, 3-dimethylethoxysilylpropylamino, 3-methyldiethoxysilylpropylamino, N-(2-aminoethyl)-3-dimethylmethoxysilylpropylamino, N-(2-aminoethyl)-3-methyldimethoxysilylpropylamino and N-(2-aminoethyl)-3-trimethoxysilylpropylamino groups.

Illustrative examples of aryloxy groups include phenoxy, naphthoxy, anthranyloxy, pyrenyloxy, biphenyloxy, terphenyloxy and fluorenyloxy groups.

Illustrative examples of aralkyloxy groups include benzyloxy, p-methylphenylmethyloxy, m-methylphenylmethyloxy, o-ethylphenylmethyloxy, m-ethylphenylmethyloxy, p-ethylphenylmethyloxy, 2-propylphenylmethyloxy, 4-isopropylphenylmethyloxy, 4-isobutylphenylmethyloxy and α-naphthylmethyloxy groups.

These groups can be easily introduced by replacing a halogen atom on a triazine ring with a compound that furnishes the corresponding substituent. For example, as shown in Scheme 3 below, by adding an aniline derivative and inducing a reaction, a hyperbranched polymer (21) having a phenylamino group on at least one end is obtained.

Scheme 3

[Chemical Formula 14]

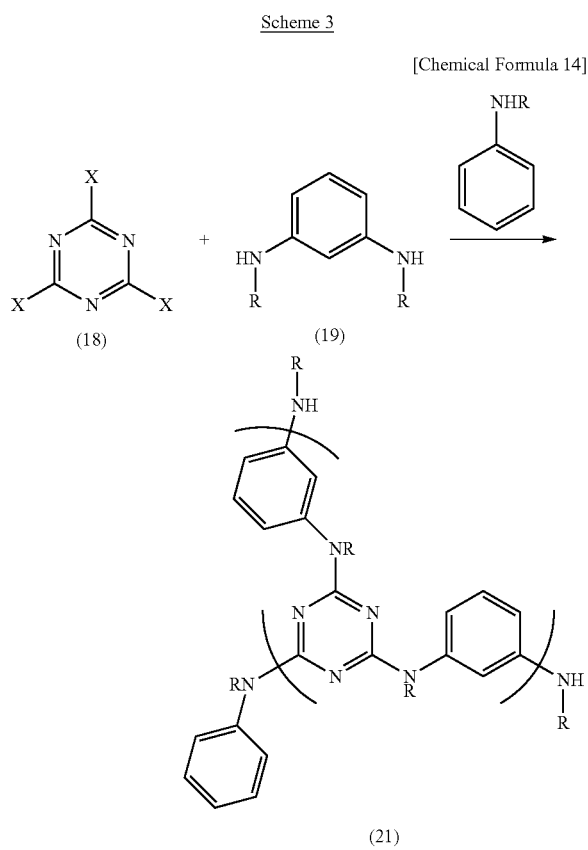

In these formulas, X and R are as defined above.

At this time, by reacting the cyanuric halide with a diaminoaryl compound while at the same time charging an organic monoamine—that is, in the presence of an organic monoamine, it is possible to obtain a flexible hyperbranched polymer having a low degree of branching in which the rigidity of the hyperbranched polymer has been diminished.

The hyperbranched polymer obtained in this way has an excellent solubility in a solvent (meaning that agglomeration is inhibited) and has an excellent crosslinkability with a crosslinking agent.

An alkyl monoamine, aralkyl monoamine or aryl monoamine may be used here as the organic monoamine.

Illustrative examples of alkyl monoamines include methylamine, ethylamine, n-propylamine, isopropylamine, n-butylamine, isobutylamine, s-butylamine, t-butylamine, n-pentylamine, 1-methyl-n-butylamine, 2-methyl-n-butylamine, 3-methyl-n-butylamine, 1,1-dimethyl-n-propylamine, 1,2-dimethyl-n-propylamine, 2,2-dimethyl-n-propylamine, 1-ethyl-n-propylamine, n-hexylamine, 1-methyl-n-pentylamine, 2-methyl-n-pentylamine, 3-methyl-n-pentylamine, 4-methyl-n-pentylamine, 1,1-dimethyl-n-butylamine, 1,2-dimethyl-n-butylamine, 1,3-dimethyl-n-butylamine, 2,2-dimethyl-n-butylamine, 2,3-dimethyl-n-butylamine, 3,3-dimethyl-n-butylamine, 1-ethyl-n-butylamine, 2-ethyl-n-butylamine, 1,1,2-trimethyl-n-propylamine, 1,2,2-trimethyl-n-propylamine, 1-ethyl-1-methyl-n-propylamine, 1-ethyl-2-methyl-n-propylamine and 2-ethylhexylamine.

Illustrative examples of aralkyl monoamines include benzylamine, p-methoxycarbonylbenzylamine, p-ethoxycarbonylbenzylamine, p-methylbenzylamine, m-methylbenzylamine and o-methoxybenzylamine.

Illustrative examples of aryl monoamines include aniline, p-methoxycarbonylaniline, p-ethoxycarbonylaniline, p-methoxyaniline, 1-naphthylamine, 2-naphthylamine, anthranylamine, 1-aminopyrene, 4-biphenylylamine, o-phenylaniline, 4-amino-p-terphenyl and 2-aminofluorene.

In this case, the amount of organic monoamine used per equivalent of the cyanuric halide is set to preferably from 0.05 to 500 equivalents, more preferably from 0.05 to 120 equivalents, and even more preferably from 0.05 to 50 equivalents.

To suppress linearity and increase the degree of branching, the reaction temperature in this case is preferably from 60 to 150° C., more preferably from 80 to 150° C., and even more preferably from 80 to 120° C.

However, mixing of the three ingredients—an organic monoamine, a cyanuric halide and a diaminoaryl compound—may be carried out at a low temperature, in which case the temperature is set to preferably from about −50° C. to about 50° C., more preferably from about −20° C. to about 50° C., and even more preferably from −20° C. to 10° C. After low-temperature charging, it is preferable to raise the temperature without interruption (i.e., in a single step) to the polymerization temperature and carry out the reaction.

Alternatively, the mixing of two ingredients—a cyanuric halide and a diaminoaryl compound—may be carried out at a low temperature, in which case the temperature is set to preferably from about −50° C. to about 50° C., more preferably from about −20° C. to about 50° C., and even more preferably from −20° C. to 10° C. After low-temperature charging, it is preferable to add the organic monoamine, raise the temperature without interruption (i.e., in a single step) to the polymerization temperature and carry out the reaction.

The reaction of the cyanuric halide with the diaminoaryl compound in the presence of such an organic monoamine may be carried out using an organic solvent like any of those mentioned above.

The crosslinking agent used in the film-forming composition of the invention is not particularly limited, provided it is a compound having substituents capable of reacting with the triazine ring-containing polymer.

Such a compound is exemplified by melamine compounds having a crosslink-forming substituent such as a methylol group or a methoxymethyl group, substituted urea compounds, compounds having a crosslink-forming substituent such as an epoxy group or an oxetane group, compounds containing a blocked isocyanate group, compounds containing an acid anhydride group, compounds having a (meth)acryl group, and phenoplast compounds. From the standpoint of heat resistance and storage stability, compounds having an epoxy group, a blocked isocyanate group or a (meth)acryl group are preferred. Compounds having a blocked isocyanate group, and polyepoxy compounds and/or poly(meth)acrylic compounds which provide compositions that are photocurable even without the use of an initiator are especially preferred.

In cases where such a compound is used in the end group treatment of polymers, it should have at least one crosslink-forming substituent per molecule. In cases where it is used in crosslinking treatment between polymers, the compound must have at least two crosslink-forming substituents per molecule.

The polyepoxy compounds are not particularly limited, provided they have two or more epoxy groups per molecule. Illustrative examples include tris(2,3-epoxypropyl) isocyanurate, 1,4-butanediol diglycidyl ether, 1,2-epoxy-4-(epoxyethyl)cyclohexane, glycerol triglycidyl ether, diethylene glycol diglycidyl ether, 2,6-diglycidylphenyl glycidyl ether, 1,1,3-tris[p-(2,3-epoxypropoxy)phenyl]propane, 1,2-cyclohexanedicarboxylic acid diglycidyl ester, 4,4'-methylenebis(N,N-diglycidylaniline), 3,4-epoxycyclohexylmethyl-3,4-epoxycyclohexane carboxylate, trimethylolethane triglycidyl ether, bisphenol A diglycidyl ether and pentaerythritol polyglycidyl ether.

Examples of commercial products that may be used include epoxy resins having at least two epoxy groups, such as YH-434 and YH-434L (from Tohto Kasei Co., Ltd.); epoxy resins having a cyclohexene oxide structure, such as Epolead GT-401, GT-403, GT-301 and GT-302, and also Celloxide 2021 and Celloxide 3000 (all from Daicel Chemical Industries, Ltd.); bisphenol A-type epoxy resins such as Epikote (now "jER") 1001, 1002, 1003, 1004, 1007, 1009, 1010 and 828 (all from Japan Epoxy Resin Co., Ltd.); bisphenol F-type epoxy resins such as Epikote (now "jER") 807 (Japan Epoxy Resin Co., Ltd.); phenol-novolak type epoxy resins such as Epikote (now "jER") 152 and 154 (Japan Epoxy Resin Co., Ltd.), and EPPN 201 and 202 (Nippon Kayaku Co., Ltd.); cresol-novolak type epoxy resins such as EOCN-102, 103S, 104S, 1020, 1025 and 1027 (Nippon Kayaku Co., Ltd.), and Epikote (now "jER") 180S75 (Japan Epoxy Resin Co., Ltd.); alicyclic epoxy resins such as Denacol EX-252 (Nagase ChemteX Corporation), CY175, CY177 and CY179 (Ciba-Geigy AG), Araldite CY-182, CY-192 and CY-184 (Ciba-Geigy AG), Epiclon 200 and 400 (DIC Corporation), Epikote (now "jER") 871 and 872 (Japan Epoxy Resin Co., Ltd.), and ED-5661 and ED-5662 (Celanese Coating KK); and aliphatic polyglycidyl ethers such as Denacol EX-611, EX-612, EX-614, EX-622, EX-411, EX-512, EX-522, EX-421, EX-313, EX-314 and EX-321 (Nagase ChemteX Corporation).

The poly(meth)acrylic compounds are not particularly limited, provided they have two or more (meth)acryl groups per molecule.

Illustrative examples include ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylolpropane triacrylate, ethoxylated trimethylolpropane trimethacrylate, ethoxylated glycerol triacrylate, ethoxylated glycerol trimethacrylate, ethoxylated pentaerythritol tetraacrylate, ethoxylated pentaerythritol tetramethacrylate, ethoxylated dipentaerythritol hexaacrylate, polyglycerol monoethylene oxide polyacrylate, polyglycerol polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylolpropane triacrylate, trimethylolpropane trimethacrylate, tricyclodecane dimethanol diacrylate, tricyclodecane dimethanol dimethacrylate, 1,6-hexanediol diacrylate and 1,6-hexanediol dimethacrylate.

The poly(meth)acrylic compound may be acquired as a commercial product, illustrative examples of which include NK Ester A-200, A-400, A-600, A-1000, A-9300, A-9300-1CL, A-TMPT, A-TMM-3, A-TMM-3L, A-TMP, A-TMMT, A-DPH, UA-53H, 1G, 2G, 3G, 4G, 9G, 14G, 23G, ABE-300, A-BPE-4, A-BPE-6, A-BPE-10, A-BPE-20, A-BPE-30, BPE-80N, BPE-100N, BPE-200, BPE-500, BPE-900, BPE-1300N, A-GLY-3E, A-GLY-9E, A-GLY-20E, A-TMPT-3EO, A-TMPT-9EO, ATM-4E, ATM-35E and ATM-20E (all from Shin-Nakamura Chemical Co., Ltd.); KAYARAD® DPEA-12, PEG400DA, THE-330 and RP-1040 (all from Nippon Kayaku Co., Ltd.); Aronix M-210, M-303, M-305, M-306, M-309, M-310, M-313, M-315, M-321, M-350, M-360, M-400, M-402, M-403, M-404, M-405, M-406, M-408, M-450, M-452 and M-460 (from Toagosei Co., Ltd.); KAYARAD® DPHA, NPGDA and PET30 (Nippon Kayaku Co., Ltd.); NK Ester A-DPH, A-TMPT, A-DCP, A-HD-N, TMPT, DCP, NPG and HD-N (all from Shin-Nakamura Chemical Co., Ltd.); NK Oligo U-15HA (Shin-Nakamura Chemical Co., Ltd.); NK Polymer Vanaresin GH-1203 (Shin-Nakamura Chemical Co., Ltd.); and EBECRYL 11, 40, 135, 140, 145, 150, 180, 1142, OTA480, IRR214-K and PEG400DA-D (all from Daicel-Allnex Ltd.).

The acid anhydride compounds are not particularly limited, provided they are carboxylic acid anhydrides obtained by the dehydration/condensation of two molecules of carboxylic acid. Examples include those having one acid anhydride group per molecule, such as phthalic anhydride, tetrahydrophthalic anhydride, hexahydrophthalic anhydride, methyl tetrahydrophthalic anhydride, methyl hexahydrophthalic anhydride, nadic anhydride, methyl nadic anhydride, maleic anhydride, succinic anhydride, octyl succinic anhydride and dodecenyl succinic anhydride; and those having two acid anhydride groups per molecule, such as 1,2,3,4-cyclobutanetetracarboxylic dianhydride, pyromellitic anhydride, 3,4-dicarboxy-1,2,3,4-tetrahydro-1-naphthalenesuccinic dianhydride, bicyclo[3.3.0]octane-2,4,6,8-tetracarboxylic dianhydride, 5-(2,5-dioxotetrahydro-3-furanyl)-3-methyl-3-cyclohexene-1,2-dicarboxylic anhydride, 1,2,3,4-butanetetracarboxylic dianhydride, 3,3',4,4'-benzophenonetetracarboxylic dianhydride, 3,3',4,4'-biphenyltetracarboxylic dianhydride, 2,2-bis(3,4-dicarboxyphenyl)hexafluoropropane dianhydride and 1,3-dimethyl-1,2,3,4-cyclobutanetetracarboxylic dianhydride.

The compounds containing blocked isocyanate groups are not particularly limited, provided they are compounds having at least two blocked isocyanate groups per molecule, i.e., isocyanate groups (—NCO) that have been blocked with suitable protecting groups, and in which, upon exposure of the compound to an elevated temperature during heat curing, the protecting groups (blocking moieties) are removed by thermal dissociation and the isocyanate groups that form as a result induce crosslinking reactions with the resin. Such compounds are exemplified by compounds having at least two groups of the following formula (which groups may be the same or may each differ) per molecule.

[Chemical Formula 15]

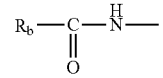

In the formula, $R_b$ is an organic group on the blocking moiety.

Such a compound can be obtained by, for example, reacting a suitable blocking agent with a compound having at least two isocyanate groups per molecule.

Examples of compounds having at least two isocyanate groups per molecule include polyisocyanates such as isophorone diisocyanate, 1,6-hexamethylene diisocyanate, methylenebis(4-cyclohexyl isocyanate) and trimethylhexamethylene diisocyanate, and also dimers and trimers thereof, as well as the reaction products of these with diols, triols, diamines or triamines.

Examples of the blocking agent include alcohols such as methanol, ethanol, isopropanol, n-butanol, 2-ethoxyhexanol, 2-N,N-dimethylaminoethanol, 2-ethoxyethanol and cyclohexanol; phenols such as phenol, o-nitrophenol, p-chlorophenol, and o-, m- and p-cresol; lactams such as s-caprolactam; oximes such as acetone oxime, methyl ethyl ketone oxime, methyl isobutyl ketone oxime, cyclohexanone oxime, acetophenone oxime and benzophenone oxime; pyrazoles such as pyrazole, 3,5-dimethylpyrazole and 3-methylpyrazole; and thiols such as dodecanethiol and benzenethiol.

The compound containing blocked isocyanate groups may also be acquired as a commercial product, examples of which include B-830, B-815N, B-842N, B-870N, B-874N, B-882N, B-7005, B7030, B-7075 and B-5010 (all from Mitsui Chemicals Polyurethanes, Inc.); Duranate® 17B-60PX, TPA-B80E, MF-B60X, MF-K60X and E402-B80T (all from Asahi Kasei Chemicals Corporation); and KarenzMOI-BM™ (Showa Denko KK).

The aminoplast compounds are not particularly limited, provided they are compounds which have at least two methoxymethylene groups per molecule. Examples include the following melamine compounds: compounds of the Cymel® series, such as hexamethoxymethylmelamine (Cymel® 303), tetrabutoxymethylglycoluril (Cymel® 1170) and tetramethoxymethylbenzoguanamine (Cymel® 1123) (all from Nihon Cytec Industries, Inc.); and compounds of the Nikalac® series, including the methylated melamine resins Nikalac® MW-30HM, MW-390, MW-100LM and MX-750LM, and the methylated urea resins Nikalac® MX-270, MX-280 and MX-290 (all from Sanwa Chemical Co., Ltd.).

The oxetane compounds are not particularly limited, provided they are compounds which have at least two oxetanyl groups per molecule. Examples include the oxetane group-bearing compounds OXT-221, OX-SQ-H and OX-SC (from Toagosei Co., Ltd.).

Phenoplast compounds are compounds which have at least two hydroxymethylene groups per molecule. Upon exposure to an elevated temperature during heat curing, crosslinking reactions proceed by way of dehydration/condensation reactions with the polymer of the invention. Examples include 2,6-dihydroxymethyl-4-methylphenol, 2,4-dihydroxymethyl-6-methylphenol, bis(2-hydroxy-3-hydroxymethyl-5-methylphenyl)methane, bis(4-hydroxy-3-hydroxymethyl-5-methylphenyl)methane, 2,2-bis(4-hydroxy-3,5-dihydroxymethylphenyl)propane, bis(3-formyl-4-hydroxyphenyl)methane, bis(4-hydroxy-2,5-dimethylphenyl)formylmethane and α,α-bis(4-hydroxy-2,5-dimethylphenyl)-4-formyltoluene.

The phenoplast compound may also be acquired as a commercial product, illustrative examples of which include 26DMPC, 46DMOC, DM-BIPC-F, DM-BIOC-F, TM-BIP-A, BISA-F, BI25X-DF and BI25X-TPA (all from Asahi Organic Chemicals Industry Co., Ltd.).

Of these, both in terms of an ability to suppress a decline in the refractive index due to inclusion of a crosslinking agent and also rapid promotion of the curing reaction, poly(meth)acrylic compounds are preferred. In particular, owing to their excellent compatibility with triazine ring-containing polymers, poly(meth)acrylic compounds having the isocyanuric acid skeleton shown below are more preferred.

Poly(meth)acrylic compounds having such skeletons are exemplified by NK Ester A-9300 and A-9300-1CL (both available from Shin-Nakamura Chemical Co., Ltd.).

[Chemical Formula 16]

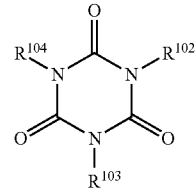

In the above formula, $R^{102}$ to $R^{104}$ are each independently a monovalent organic group having at least one terminal (meth)acryl group.

To further enhance the rate of cure and also increase the solvent resistance, acid resistance and alkali resistance of the resulting cured film, it is advantageous to use a poly(meth)acrylic compound which at 25° C. is a liquid and has a viscosity of 5,000 mPa·s or less, preferably from 1 to 3,000 mPa·s, more preferably from 1 to 1,000 mPa·s, and even more preferably from 1 to 500 mPa·s (referred to below as a "low-viscosity crosslinking agent"), either singly or as a combination of two or more thereof, or in combination with the above-described poly(meth)acrylic compound having an isocyanuric acid skeleton.

Such a low-viscosity crosslinking agent may also be acquired as a commercial product. Examples include, of the above-mentioned poly(meth)acrylic compounds, crosslinking agents in which the chain lengths between (meth)acryl groups are relatively long, such as NK Ester A-GLY-3E (85 mPa·s at 25° C.), A-GLY-9E (95 mPa·s at 25° C.), A-GLY-20E (200 mPa·s at 25° C.), A-TMPT-3EO (60 mPa·s at 25° C.), A-TMPT-9EO, ATM-4E (150 mPa·s at 25° C.) and ATM-35E (350 mPa·s at 25° C.) (all from Shin-Nakamura Chemical Co., Ltd.).

In addition, to enhance the alkali resistance of the resulting cured film, it is preferable to use a combination of at least one of NK Ester A-GLY-20E (Shin-Nakamura Chemical Co., Ltd.) and NK Ester ATM-35E (Shin-Nakamura Chemical Co., Ltd.) with the above-described poly(meth)acrylic compound having an isocyanuric acid skeleton.

The above crosslinking agent may be used singly or two or more may be used in combination. The amount of crosslinking agent used per 100 parts by weight of the triazine ring-containing polymer is preferably from 1 to 100 parts by weight. From the standpoint of solvent resistance, the lower limit is preferably 2 parts by weight, and more preferably 5 parts by weight. From the standpoint of control of the refractive index, the upper limit is preferably 20 parts by weight, and more preferably 15 parts by weight.

Initiators corresponding to the respective crosslinking agents may also be included in the film-forming composition of the invention. As noted above, when a polyepoxy compound and/or a poly(meth)acrylic compound are used as crosslinking agents, photocuring is promoted even without the use of an initiator, giving a cured film, although it is acceptable to use an initiator in such cases.

When a polyepoxy compound is used as the crosslinking agent, a photoacid generator or a photobase generator may be used as the initiator.

The photoacid generator used may be one that is suitably selected from among known photoacid generators. For example, use may be made of onium salt derivatives such as diazonium salts, sulfonium salts or iodonium salts.

Illustrative examples include aryldiazonium salts such as phenyldiazonium hexafluorophosphate, 4-methoxyphenyldiazonium hexafluoroantimonate and 4-methylphenyldiazonium hexafluorophosphate; diaryliodonium salts such as diphenyliodonium hexafluoroantimonate, di(4-methylphenyl)iodonium hexafluorophosphate and di(4-tert-butylphenyl)iodonium hexafluorophosphate; and triarylsulfonium salts such as triphenylsulfonium hexafluoroantimonate, tris(4-methoxyphenyl)sulfonium hexafluorophosphate, diphenyl-4-thiophenoxyphenylsulfonium hexafluoroantimonate, diphenyl-4-thiophenoxyphenylsulfonium hexafluorophosphate, 4,4'-bis(diphenylsulfonio)phenylsulfide bishexafluoroantimonate, 4,4'-bis(diphenylsulfonio)phenylsulfide bishexafluorophosphate, 4,4'-bis[di(p-hydroxyethoxy)phenylsulfonio]phenylsulfide bishexafluoroantimonate, 4,4'-bis[di(β-hydroxyethoxy)phenylsulfonio]phenylsulfide bishexafluorophosphate, 4-[4'-(benzoyl)phenylthio]phenyl-di(4-fluorophenyl)sulfonium hexafluoroantimonate and 4-[4'-(benzoyl)phenylthio]phenyl-di(4-fluorophenyl)sulfonium hexafluorophosphate.

Commercial products may be used as these onium salts. Illustrative examples include San-Aid SI-60, SI-80, SI-100, SI-60L, SI-80L, SI-100L, SI-L145, SI-L150, SI-L160, SI-L110 and SI-L147 (all available from Sanshin Chemical Industry Co., Ltd.); UVI-6950, UVI-6970, UVI-6974, UVI-6990 and UVI-6992 (all available from Union Carbide); CPI-100P, CPI-100A, CPI-200K and CPI-200S (all available from San-Apro Ltd.); Adeka Optomer SP-150, SP-151, SP-170 and SP-171 (all available from Adeka Corporation); Irgacure 261 (BASF); CI-2481, CI-2624, CI-2639 and CI-2064 (Nippon Soda Co., Ltd.); CD-1010, CD-1011 and CD-1012 (Sartomer Company); DS-100, DS-101, DAM-101, DAM-102, DAM-105, DAM-201, DSM-301, NAI-100, NAI-101, NAI-105, NAI-106, SI-100, SI-101, SI-105, SI-106, PI-105, NDI-105, BENZOIN TOSYLATE, MBZ-101, MBZ-301, PYR-100, PYR-200, DNB-101, NB-101, NB-201, BBI-101, BBI-102, BBI-103 and BBI-109 (all from Midori Kagaku Co., Ltd.); PCI-061T, PCI-062T, PCI-020T and PCI-022T (all from Nippon Kayaku Co., Ltd.); and IBPF and IBCF (Sanwa Chemical Co., Ltd.).

The photobase generator used may be one selected from among known photobase generators. For example, use may be made of Co-amine complex-type, oxime carboxylic acid ester-type, carbamic acid ester-type and quaternary ammonium salt-type photobase generators.

Illustrative examples include 2-nitrobenzylcyclohexyl carbamate, triphenylmethanol, O-carbamoylhydroxylamine, O-carbamoyloxime, [[(2,6-dinitrobenzyl)oxy]carbonyl]cyclohexylamine, bis[[(2-nitrobenzyl)oxy]carbonyl]hexane-1,6-diamine, 4-(methylthiobenzoyl)-1-methyl-1-morpholinoethane, (4-morpholinobenzoyl)-1-benzyl-1-dimethylaminopropane, N-(2-nitrobenzyloxycarbonyl)pyrrolidine, hexaamminecobalt(III) tris(triphenylmethylborate), 2-benzyl-2-dimethylamino-1-(4-morpholinophenyl)butanone, 2,6-dimethyl-3,5-diacetyl-4-(2'-nitrophenyl)-1,4-dihydropyridine and 2,6-dimethyl-3,5-diacetyl-4-(2',4'-dinitrophenyl)-1,4-dihydropyridine.

A commercial product may be used as the photobase generator. Illustrative examples include TPS-OH, NBC-101 and ANC-101 (all available under these product names from Midori Kagaku Co., Ltd.).

In cases where a photoacid or photobase generator is used, the amount thereof is preferably in the range of 0.1 to 15 parts by weight, and more preferably in the range of 1 to 10 parts by weight, per 100 parts by weight of the polyepoxy compound.

Also, from 1 to 100 parts by weight of an epoxy resin curing agent may be optionally included per 100 parts by weight of the polyepoxy compound.

In cases where a poly(meth)acrylic compound is used, a photoradical initiator may also be used.

A known photoradical initiator may be suitably selected and used for this purpose. Exemplary photoradical initiators include acetophenones, benzophenones, Michler's benzoyl benzoate, amyloxime esters, oxime esters, tetramethylthiuram monosulfide and thioxanthenes.

Photocleavable photoradical initiators are especially preferred. Photocleavable photoradical initiators are listed on page 159 of Saishin UV Koka Gijutsu [Recent UV Curing Technology] (publisher, K. Takausu; published by Gijutsu Joho Kyokai KK; 1991).

Examples of commercial photoradical initiators include those available from BASF under the trade names Irgacure 127, 184, 369, 379, 379EG, 651, 500, 754, 819, 903, 907, 784, 2959, CGI1700, CGI1750, CGI1850, CG24-61, OXE01 and OXE02, and the trade names Darocur 1116, 1173 and MBF; that available from BASF under the trade name Lucirin TPO; that available from UCB under the trade name Uvecryl P36; and those available under the trade names Esacure KIP150, KIP65LT, KIP100F, KT37, KT55, KT046 and KIP75/B from the Fratelli Lamberti Company.

The photoradical initiator is used in the range of preferably 0.1 to 200 parts by weight, and more preferably 1 to 150 parts by weight, per 100 parts by weight of the poly(meth)acrylic compound.

In addition to the triazine ring-containing polymer and the crosslinking agent described above, the film-forming composition of the invention also includes an ultraviolet absorber and a light stabilizer. By including these, film loss that arises due to deterioration of the triazine ring-containing polymer in the cured film owing to the influence of ultraviolet light and the like can be suppressed.

The ultraviolet absorber is exemplified by organic compounds such as benzotriazole compounds, benzophenone compounds, triazine compounds, cyclic imino ester compounds, cyanoacrylate compounds, malonate esters and phenyl salicylate compounds; and by ultraviolet-absorbing inorganic fine particles such as titanium oxide fine particles, zinc oxide fine particles and tin oxide fine particles.

Of these, from the standpoint of enhancing the weather resistance of the resulting cured film and also preventing discoloration of the cured film, benzotriazole compounds and triazine compounds are preferred, with hydroxyphenyltriazine compounds being more preferred.

Illustrative examples of ultraviolet absorbers include triazoles such as 2-(5-methyl-2-hydroxyphenyl)benzotriazole, 2-[2-hydroxy-3,5-bis(α,α-dimethylbenzyl)phenyl]-2H-benzotriazole and 2-(3,5-di-t-butyl-2-hydroxyphenyl)benzotriazole; benzophenones such as 2-hydroxy-4-methoxybenzophenone, 2-hydroxy-4-octoxybenzophenone and 2,2'-dihydroxy-4-methoxybenzophenone;
hydroxyphenyltriazines such as [2-(4,6-diphenyl-1,3,5-triazine-2,2-yl)-5-(hexyl)oxy]-phenol, 2-[4-[2-hydroxy-3-dodecyloxypropyl)oxy]-2-hydroxyphenyl]-4,6-bis(2,4-dimethylphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, 2-[4-[(2-hydroxy-3-(2'-ethyl)hexyl)oxy]-2-hydroxyphenyl]-4,6-bis(2,4-dimethylphenyl)-1,3,5-triazine and 2-(2-hydroxy-4-[1-octyloxycarbonylethoxy]phenyl)-4,6-bis(4-phenylphenyl)-1,3,5-triazine;
oxalic acid anilides such as 2-ethoxy-2'-ethyloxalic acid bisanilide;
salicylic acid compounds such as phenyl salicylate, p-t-butylphenyl salicylate and p-octylphenyl salicylate;

cyclic imino esters such as 2,2'-p-phenylenebis(3,1-benzoxazin-4-one);

cyanoacrylates such as 1,3-bis[(2-cyano-3,3-diphenylacryloyl)oxy]-2,2-bis[[(2-cyano-3,3-diphenylacryloyl)oxy]methyl]propane; and malonate esters such as tetraethyl-2,2'-(1,4-phenylenedimethylidyne)bismalonate.

Examples of commercial ultraviolet absorbers include TINUVIN® PS, 99-2, 99-DW, 109, 328, 329, 384-2, 400, 400-DW, 405, 460, 477, 477-DW, 479, 900, 928, 1130, 111FDL (all available from BASF Japan Ltd.); ADK STAB LA-29, LA-31, LA-31RG, LA-31G, LA-32, LA-36RG, LA-46, 1413 and LA-F70 (all from Adeka Corporation); Newcoat UVA-101, UVA-102, UVA-103 and UVA-104, and Vanaresin UVA-5080, UVA-5080 (OHV20), UVA-55T, UVA-5MHB, UVA-7075, UVA-7075 (OHV20) and UVA-73T (all from Shin-Nakamura Chemical Co., Ltd.); and RUVA-93 (Otsuka Pharmaceutical Co., Ltd.)

In this invention, the ultraviolet absorber may be used singly, or two or more may be used in combination.

The ultraviolet absorber is used in an amount of preferably 1 to 100 parts by weight per 100 parts by weight of the triazine ring-containing polymer. However, to further increase the weather resistance of the resulting cured film, the lower limit is preferably 5 parts by weight, and more preferably 10 parts by weight. To prevent a decrease in the refractive index of the cured film and to prevent discoloration of the film, the upper limit is preferably 30 parts by weight, and more preferably 20 parts by weight.

The light stabilizer is exemplified by hindered amine-type compounds and benzoate-type compounds.

Illustrative examples of the light stabilizer include hindered amines such as bis(2,2,6,6-tetramethyl-4-piperidyl) sebacate, bis(1,2,2,6,6-pentamethyl-4-piperidyl) sebacate, bis(1,2,2,6,6-pentamethyl-4-piperidyl)[(3,5-bis(1,1-dimethylethyl)-4-hydroxyphenyl)methyl]butyl malonate.

Examples of commercial light stabilizers include TINUVIN® 123, 123-DW, 144, 144PA, 152, 292, 622LD, 744, 765, 770, 5050, 5060, 5100, 5151 and CHIMASSORB 944LD (all available from BASF Japan Ltd.); ADK STAB LA-52, LA-57, LA-62, LA-63, LA-63P, LA-67, LA-68, LA-72, LA-77Y, LA-77G, LA-F81, LA-82, LA-87, LA-402AF and LA-502XP (all from Adeka Corporation); and UV-3034 (Goodrich Corporation).

In this invention, the light stabilizer may be used singly, or two or more may be used in combination.

The light stabilizer is used in an amount of preferably 1 to 100 parts by weight per 100 parts by weight of the triazine ring-containing polymer. However, to further increase the weather resistance of the resulting cured film, the lower limit is preferably 2 parts by weight, and more preferably 5 parts by weight. To prevent a decrease in the refractive index of the cured film, the upper limit is preferably 30 parts by weight, and more preferably 20 parts by weight.

An ultraviolet absorber and a light stabilizer are used together in this invention, but to further enhance the weather resistance of the resulting cured film and effectively suppress film loss, these two ingredients are used in relative proportions, expressed as the weight ratio "light stabilizer/UV absorber," of preferably from 95/5 to 5/95, and more preferably from 80/20 to 20/80.

Particularly in thin films having a thickness of 100 nm or less, to further increase the film loss suppressing effect, these two ingredients are used in relative proportions, expressed as the weight ratio "light stabilizer/UV absorber," of preferably from 1/1 to 4/1, and more preferably from 2/1 to 4/1.

Any of various types of solvents may be added to the film-forming composition of the invention and used to dissolve the triazine ring-containing polymer.

Illustrative examples of the solvent include water, toluene, p-xylene, o-xylene, m-xylene, ethylbenzene, styrene, ethylene glycol dimethyl ether, propylene glycol monomethyl ether, ethylene glycol monomethyl ether, propylene glycol, propylene glycol monoethyl ether, ethylene glycol monoethyl ether, ethylene glycol monoisopropyl ether, ethylene glycol methyl ether acetate, propylene glycol monomethyl ether acetate, ethylene glycol ethyl ether acetate, diethylene glycol dimethyl ether, propylene glycol monobutyl ether, ethylene glycol monobutyl ether, diethylene glycol diethyl ether, dipropylene glycol monomethyl ether, diethylene glycol monomethyl ether, dipropylene glycol monoethyl ether, diethylene glycol monoethyl ether, triethylene glycol dimethyl ether, diethylene glycol monoethyl ether acetate, diethylene glycol, 1-octanol, ethylene glycol, hexylene glycol, trimethylene glycol, 1-methoxy-2-butanol, cyclohexanol, diacetone alcohol, furfuryl alcohol, tetrahydrofurfuryl alcohol, propylene glycol, benzyl alcohol, 1,3-butanediol, 1,4-butanediol, 2,3-butanediol, y-butyrolactone, acetone, methyl ethyl ketone, methyl isopropyl ketone, diethyl ketone, methyl isobutyl ketone, methyl n-butyl ketone, cyclopentanone, cyclohexanone, ethyl acetate, isopropyl acetate, n-propyl acetate, isobutyl acetate, n-butyl acetate, ethyl lactate, methanol, ethanol, isopropanol, tert-butanol, allyl alcohol, n-propanol, 2-methyl-2-butanol, isobutanol, n-butanol, 2-methyl-1-butanol, 1-pentanol, 2-methyl-1-pentanol, 2-ethylhexanol, 1-methoxy-2-propanol, tetrahydrofuran, 1,4-dioxane, N,N-dimethylformamide, N,N-dimethylacetamide (DMAc), N-methylpyrrolidone, 1,3-dimethyl-2-imidazolidinone, dimethylsulfoxide and N-cyclohexyl-2-pyrrolidinone. These may be used singly or two or more may be used in combination.

At this time, the solids concentration in the film-forming composition is not particularly limited, provided it is in a range that does not adversely affect the storage stability, and may be suitably selected according to the target film thickness. Specifically, from the standpoint of solubility and storage stability, the solids concentration is preferably from 0.1 to 50 wt %, and more preferably from 0.1 to 40 wt %.

Ingredients other than the triazine ring-containing polymer, crosslinking agent, ultraviolet absorber, light stabilizer and solvent may also be included in the film-forming compositions of the invention, provided that doing so does not detract from the advantageous effects of the invention. Examples of such other ingredients include additives such as leveling agents, surfactants, antioxidants, corrosion inhibitors, mold release agents, plasticizers, defoaming agents, thickeners, dispersants, antistatic agents, sedimentation inhibitors, pigments, dyes and silane coupling agents.

Illustrative examples of surfactants include the following nonionic surfactants: polyoxyethylene alkyl ethers such as polyoxyethylene lauryl ether, polyoxyethylene stearyl ether, polyoxyethylene cetyl ether and polyoxyethylene oleyl ether; polyoxyethylene alkyl aryl ethers such as polyoxyethylene octyl phenyl ether and polyoxyethylene nonyl phenyl ether; polyoxyethylene-polyoxypropylene block copolymers; sorbitan fatty acid esters such as sorbitan monolaurate, sorbitan monopalmitate, sorbitan monostearate, sorbitan monooleate, sorbitan trioleate and sorbitan tristearate; and polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan trioleate and polyoxyethylene sorbitan tristearate; and additionally include fluorosurfactants such as those available under the trade names Eftop EF301, EF303 and EF352 (from Mitsubishi Materials Electronic Chemicals Co., Ltd. (formerly Jemco Inc.)), Megafac F171, F173, R-08, R-30, R-40, F-553, F-554, RS-75 and RS-72-K (DIC Corporation), Fluorad FC430 and FC431 (Sumitomo 3M, Ltd.), AsahiGuard AG710 and Surflon S-382, SC101, SC102, SC103, SC104, SC105 and SC106 (Asahi Glass Co., Ltd.); and also the organosiloxane polymers KP341 (Shin-Etsu Chemical Co., Ltd.) and BYK-302, BYK-307, BYK-322, BYK-323, BYK-330, BYK-333, BYK-370, BYK-375 and BYK-378 (BYK-Chemie Japan KK).

These surfactants may be used singly or two or more may be used in combination. The amount of surfactant used per 100 parts by weight of the triazine ring-containing polymer is preferably from 0.0001 to 5 parts by weight, more preferably from 0.001 to 1 part by weight, and even more preferably from 0.01 to 0.5 part by weight.

The other ingredients mentioned above may be added in any step during preparation of the inventive composition.

The film-forming composition of the invention may be formed into the desired cured film by applying the composition onto a substrate, optionally heating to evaporate off the solvent, and followed by heating or light exposure.

Any suitable method may be used for applying the composition, such as spin coating, dipping, flow coating, inkjet printing, spray coating, bar coating, gravure coating, slit coating, roll coating, transfer printing, brush coating, blade coating and air knife coating.

Illustrative examples of the substrate include silicon, indium tin oxide (ITO)-coated glass, indium zinc oxide (IZO)-coated glass, conductive metal nanowire or conductive metal nanomesh on polyethylene terephthalate (PET) film, plastic, glass, quartz and ceramic. Use can also be made of a flexible substrate having pliability.

The bake temperature for evaporating off the solvent is not particularly limited. The bake may be carried out at, for example, from 40 to 400° C.

The bake process is not particularly limited. For example, evaporation may be effected using a hot plate or an oven, such evaporation being carried out under a suitable atmosphere, such as in open air, in nitrogen or another inert gas, or in a vacuum.

With regard to the bake temperature and time, conditions which are compatible with the processing steps for the target electronic device should be selected. Bake conditions should be selected in such a way that the physical values of the resulting film conform to the required characteristics of the electronic device.

The conditions in cases where exposure to light is carried out are also not particularly limited. For example, an exposure energy and time which are suitable for the triazine ring-containing polymer and crosslinking agent that are used may be employed.

Because the film thus obtained from the inventive composition cured film is able to achieve a high heat resistance, high transparency, high refractive index, high solubility, low volume shrinkage and high weather resistance, it can be advantageously used as a component in the manufacture of electronic devices such as liquid-crystal displays, organic electroluminescence (EL) displays, touch panels, optical semiconductor (LED) devices, solid-state image sensors, organic thin-film solar cells, dye-sensitized solar cells and organic thin-film transistors (TFTs); and as functional films such as weather-resistant films having a high refractive index.

EXAMPLES

Synthesis Examples, Working Examples, and Comparative Examples are given below to more concretely illustrate the invention, although the invention is not limited by these Examples. The instruments used in the examples were as follows.

[$^1$H-NMR]
  Instruments: Varian NMR System 400 NB (400 MHz)
    JEOL-ECA700 (700 MHz)
  Solvent used in measurement: DMSO-d6
  Reference material: Tetramethylsilane (TMS) ($\delta$=0.0 ppm)
[GPC]
  Instrument: HLC-8200 GPC (Tosoh Corporation)
  Columns: Shodex KF-804L+KF-805L
  Column temperature: 40° C.
  Solvent: Tetrahydrofuran (THF)
  Detector: UV (254 nm)
  Calibration curve: polystyrene standard
[Ellipsometer]
  Instrument: VASE multiple incident angle spectroscopic ellipsometer (JA Woollam Japan)
[Thermogravimetric/Differential Thermal Analyzer (TG-DTA)]
  Instrument: TG-8120 (Rigaku Corporation)
  Temperature ramp-up rate: 10° C./min
  Measurement temperatures: 25° C. to 750° C.
[Light Resistance Tester]
  Instrument: Q-Sun Xe-1-B Xenon Weathering Tester, from Q-LAB

[1] Synthesis of Triazine Ring-Containing Hyperbranched Polymer

[Synthesis Example 1] Synthesis of HB-TmDA

[Chemical Formula 17]

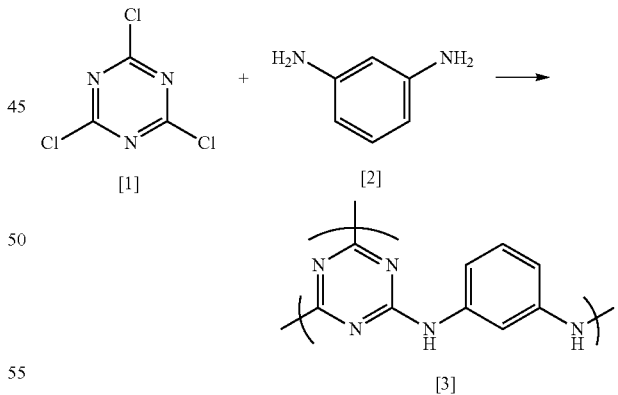

Under nitrogen, 456.02 g of DMAc was added to a 1,000 mL four-neck flask and cooled to −10° C. in an acetone-dry ice bath, following which 84.83 g (0.460 mol) of 2,4,6-trichloro-1,3,5-triazine [1] (Evonik Degussa) was added and dissolved therein. Next, a solution of 62.18 g (0.575 mol) of m-phenylenediamine [2] dissolved in 304.01 g of DMAc, and 14.57 g (0.156 mol) of aniline were added dropwise. After dropwise addition, the flask contents were stirred for 30 minutes. Using a fluid transfer pump, the reaction mixture was added dropwise over a period of 1 hour to a 2,000 mL four-neck flask that already contained 621.85 g of DMAc and had been heated beforehand to 85° C. in an oil bath. Following addition of the reaction mixture, stirring was carried out for 1 hour, effecting polymerization.

Next, aniline (113.95 g, 1.224 mol) was added and the flask contents were stirred for 1 hour, bringing the reaction to completion. The system was cooled to room temperature in an ice bath, after which triethylamine (116.36 g, 1.15 mol) was added dropwise and 30 minutes of stirring was carried out, thereby quenching the hydrochloric acid. The hydrochloride that settled out was removed by filtration. The filtered reaction mixture was reprecipitated in a mixed solution of 28% ammonia water (279.29 g) and deionized water (8,820 g). The precipitate was filtered, dried in a vacuum desiccator at 150° C. for 8 hours, then redissolved in THF (833.1 g) and reprecipitated in deionized water (6,665 g). The resulting precipitate was filtered, then dried in a vacuum desiccator at 150° C. for 25 hours, yielding 118.0 g of the target polymer compound [3] (referred to below as "HB-TmDA40").

FIG. 1 shows the measured $^1$H-NMR spectrum for HB-TmDA40. The HB-TmDA40 thus obtained was a compound having structural units of formula (1). The polystyrene-equivalent weight-average molecular weight Mw of HB-TmDA40, as measured by GPC, was 4,300, and the polydispersity Mw/Mn was 3.44.

(1) Heat Resistance Test

Figure 2:
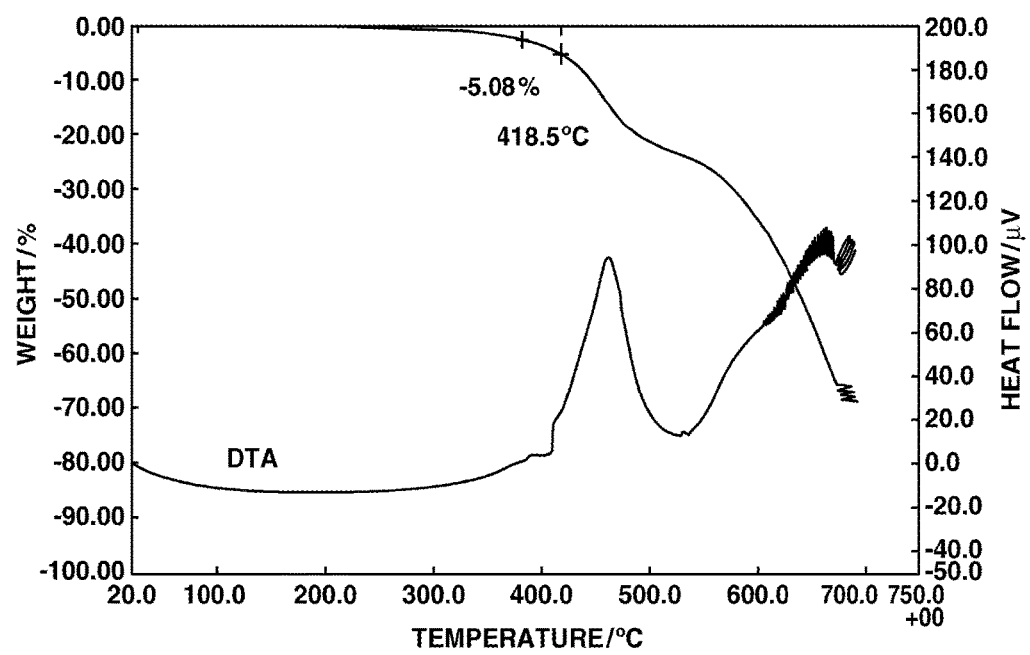
FIG. 2 is a plot showing the TG-DTA results for Polymer Compound [3] obtained in Synthesis Example 1.

TG-DTA measurement was carried out on the HB-TmDA40 obtained in Synthesis Example 1, whereupon the 5% weight loss temperature was 419° C. The results are shown in FIG. 2.

(2) Measurement of Refractive Index

The HB-TmDA40 obtained in Synthesis Example 1 (0.5 g) was dissolved in 4.5 g of cyclohexanone, giving a clear, light yellow-colored solution. Using a spin coater, the resulting polymer varnish was spin-coated onto a glass substrate at 200 rpm for 5 seconds and at 2,000 rpm for 30 seconds, following which the solvent was removed by heating at 150° C. for 1 minute and at 250° C. for 5 minutes, thereby giving a film. Upon measurement, the resulting film was found to have a refractive index at 550 nm of 1.790.

Production Example 1

A 20 wt % solution (referred to below as "HB-TmDA40V1") was prepared by dissolving 100 g of the HB-TmDA40 obtained in Synthesis Example 1 in a mixed solvent consisting of 384.0 g of cyclohexanone and 16.0 g of deionized water.

[2] Preparation 1 of Film-Forming Compositions

[Working Example 1] Film-Forming Composition 1

A varnish (referred to below as "HB-TmDA40VF1") having a total solids concentration of 12 wt % was prepared by adding together 5.0 g of the HB-TmDA40V1 solution prepared in Production Example 1, 1.0 g of a 10 wt % cyclohexanone solution of ethoxylated glycerol triacrylate (A-GLY-20-E, 200 mPa·s; from Shin-Nakamura Chemical Co., Ltd.) and 0.3 g of a 10 wt % cyclohexanone solution of ethoxylated pentaerythritol tetraacrylate (ATM-35E, 350 mPa·s; from Shin-Nakamura Chemical Co., Ltd.) as crosslinking agents, 0.5 g of a 10 wt % cyclohexanone solution of Tinuvin 460 (BASF) as an ultraviolet absorber (abbreviated below as "UVA") and 0.5 g of a 10 wt % cyclohexanone solution of Tinuvin 292 (BASF) as a light stabilizer (abbreviated below as "HALS") such that the weight ratio HALS/UVA=1/1, 1.6 g of a 5 wt % cyclohexanone solution of Irgacure 184 (BASF) as a photoradical polymerization initiator, 0.05 g of a 1 wt % cyclohexanone solution of Megafac R-40 (DIC Corporation) as a surfactant, 0.07 g of deionized water and 1.80 g of cyclohexanone, and then visually checking that dissolution had occurred.

[Working Example 2] Film-Forming Composition 2

A varnish (referred to below as "HB-TmDA40VF2") having a total solids concentration of 12 wt % was prepared by adding together 5.0 g of the HB-TmDA40V1 solution prepared in Production Example 1, 1.0 g of a 10 wt % cyclohexanone solution of ethoxylated glycerol triacrylate (A-GLY-20-E, 200 mPa·s; from Shin-Nakamura Chemical Co., Ltd.) and 0.3 g of a 10 wt % cyclohexanone solution of ethoxylated pentaerythritol tetraacrylate (ATM-35E, 350 mPa·s; from Shin-Nakamura Chemical Co., Ltd.) as crosslinking agents, 0.5 g of a 10 wt % cyclohexanone solution of Tinuvin 460 (BASF) as an ultraviolet absorber and 1.0 g of a 10 wt % cyclohexanone solution of Tinuvin 292 (BASF) as a light stabilizer such that the weight ratio HALS/UVA=2/1, 1.6 g of a 5 wt % cyclohexanone solution of Irgacure 184 (BASF) as a photoradical polymerization initiator, 0.05 g of a 1 wt % cyclohexanone solution of Megafac R-40 (DIC Corporation) as a surfactant, 0.07 g of deionized water and 1.67 g of cyclohexanone, and then visually checking that dissolution had occurred.

[Working Example 3] Film-Forming Composition 3

A varnish (referred to below as "HB-TmDA40VF3") having a total solids concentration of 12 wt % was prepared by adding together 5.0 g of the HB-TmDA40V1 solution prepared in Production Example 1, 1.0 g of a 10 wt % cyclohexanone solution of ethoxylated glycerol triacrylate (A-GLY-20-E, 200 mPa·s; from Shin-Nakamura Chemical Co., Ltd.) and 0.3 g of a 10 wt % cyclohexanone solution of ethoxylated pentaerythritol tetraacrylate (ATM-35E, 350 mPa·s; from Shin-Nakamura Chemical Co., Ltd.) as crosslinking agents, 0.5 g of a 10 wt % cyclohexanone solution of Tinuvin 460 (BASF) as an ultraviolet absorber and 2.0 g of a 10 wt % cyclohexanone solution of Tinuvin 292 (BASF) as a light stabilizer such that the weight ratio HALS/UVA=4/1, 1.6 g of a 5 wt % cyclohexanone solution of Irgacure 184 (BASF) as a photoradical polymerization initiator, 0.05 g of a 1 wt % cyclohexanone solution of Megafac R-40 (DIC Corporation) as a surfactant, 0.06 g of deionized water and 1.41 g of cyclohexanone, and then visually checking that dissolution had occurred.

[Working Example 4] Film-Forming Composition 4

A varnish (referred to below as "HB-TmDA40VF4") having a total solids concentration of 12 wt % was prepared by adding together 5.0 g of the HB-TmDA40V1 solution prepared in Production Example 1, 1.0 g of a 10 wt % cyclohexanone solution of ethoxylated glycerol triacrylate (A-GLY-20-E, 200 mPa·s; from Shin-Nakamura Chemical Co., Ltd.) and 0.3 g of a 10 wt % cyclohexanone solution of ethoxylated pentaerythritol tetraacrylate (ATM-35E, 350 mPa·s; from Shin-Nakamura Chemical Co., Ltd.) as crosslinking agents, 0.5 g of a 10 wt % cyclohexanone solution of Tinuvin 329 (BASF) as an ultraviolet absorber and 1.0 g of a 10 wt % cyclohexanone solution of Tinuvin 292 (BASF) as a light stabilizer such that the weight ratio HALS/UVA=2/

1, 1.6 g of a 5 wt % cyclohexanone solution of Irgacure 184 (BASF) as a photoradical polymerization initiator, 0.05 g of a 1 wt % cyclohexanone solution of Megafac R-40 (DIC Corporation) as a surfactant, 0.07 g of deionized water and 1.67 g of cyclohexanone, and then visually checking that dissolution had occurred.

[Working Example 5] Film-Forming Composition 5

A varnish (referred to below as "HB-TmDA40VF5") having a total solids concentration of 12 wt % was prepared by adding together 5.0 g of the HB-TmDA40V1 solution prepared in Production Example 1, 1.0 g of a 10 wt % cyclohexanone solution of ethoxylated glycerol triacrylate (A-GLY-20-E, 200 mPa·s; from Shin-Nakamura Chemical Co., Ltd.) and 0.3 g of a 10 wt % cyclohexanone solution of ethoxylated pentaerythritol tetraacrylate (ATM-35E, 350 mPa·s; from Shin-Nakamura Chemical Co., Ltd.) as cross-linking agents, 0.5 g of a 10 wt % cyclohexanone solution of Tinuvin 460 (BASF) as an ultraviolet absorber and 0.1 g of a 10 wt % cyclohexanone solution of Tinuvin 292 (BASF) as a light stabilizer such that the weight ratio HALS/UVA=1/5, 1.6 g of a 5 wt % cyclohexanone solution of Irgacure 184 (BASF) as a photoradical polymerization initiator, 0.05 g of a 1 wt % cyclohexanone solution of Megafac R-40 (DIC Corporation) as a surfactant, 0.08 g of deionized water and 1.72 g of cyclohexanone, and then visually checking that dissolution had occurred.

[Working Example 6] Film-Forming Composition 6

A varnish (referred to below as "HB-TmDA40VF6") having a total solids concentration of 12 wt % was prepared by adding together 5.0 g of the HB-TmDA40V1 solution prepared in Production Example 1, 1.0 g of a 10 wt % cyclohexanone solution of ethoxylated glycerol triacrylate (A-GLY-20-E, 200 mPa·s; from Shin-Nakamura Chemical Co., Ltd.) and 0.3 g of a 10 wt % cyclohexanone solution of ethoxylated pentaerythritol tetraacrylate (ATM-35E, 350 mPa·s; from Shin-Nakamura Chemical Co., Ltd.) as cross-linking agents, 1.0 g of a 10 wt % cyclohexanone solution of Tinuvin 460 (BASF) as an ultraviolet absorber and 1.0 g of a 10 wt % cyclohexanone solution of Tinuvin 292 (BASF) as a light stabilizer such that the weight ratio HALS/UVA=1/1, 1.6 g of a 5 wt % cyclohexanone solution of Irgacure 184 (BASF) as a photoradical polymerization initiator, 0.05 g of a 1 wt % cyclohexanone solution of Megafac R-40 (DIC Corporation) as a surfactant, 0.06 g of deionized water and 1.54 g of cyclohexanone, and then visually checking that dissolution had occurred.

[Working Example 7] Film-Forming Composition 7

A varnish (referred to below as "HB-TmDA40VF7") having a total solids concentration of 12 wt % was prepared by adding together 5.0 g of the HB-TmDA40V1 solution prepared in Production Example 1, 1.0 g of a 10 wt % cyclohexanone solution of ethoxylated glycerol triacrylate (A-GLY-20-E, 200 mPa·s; from Shin-Nakamura Chemical Co., Ltd.) and 0.3 g of a 10 wt % cyclohexanone solution of ethoxylated pentaerythritol tetraacrylate (ATM-35E, 350 mPa·s; from Shin-Nakamura Chemical Co., Ltd.) as cross-linking agents, 2.0 g of a 10 wt % cyclohexanone solution of Tinuvin 460 (BASF) as an ultraviolet absorber and 1.0 g of a 10 wt % cyclohexanone solution of Tinuvin 292 (BASF) as a light stabilizer such that the weight ratio HALS/UVA=1/2, 1.6 g of a 5 wt % cyclohexanone solution of Irgacure 184 (BASF) as a photoradical polymerization initiator, 0.05 g of a 1 wt % cyclohexanone solution of Megafac R-40 (DIC Corporation) as a surfactant, 0.05 g of deionized water and 1.28 g of cyclohexanone, and then visually checking that dissolution had occurred.

[Working Example 8] Film-Forming Composition 8

A varnish (referred to below as "HB-TmDA40VF8") having a total solids concentration of 12 wt % was prepared by adding together 5.0 g of the HB-TmDA40V1 solution prepared in Production Example 1, 1.0 g of a 10 wt % cyclohexanone solution of ethoxylated glycerol triacrylate (A-GLY-20-E, 200 mPa·s; from Shin-Nakamura Chemical Co., Ltd.) and 0.3 g of a 10 wt % cyclohexanone solution of ethoxylated pentaerythritol tetraacrylate (ATM-35E, 350 mPa·s; from Shin-Nakamura Chemical Co., Ltd.) as cross-linking agents, 4.0 g of a 10 wt % cyclohexanone solution of Tinuvin 460 (BASF) as an ultraviolet absorber and 1.0 g of a 10 wt % cyclohexanone solution of Tinuvin 292 (BASF) as a light stabilizer such that the weight ratio HALS/UVA=1/4, 1.6 g of a 5 wt % cyclohexanone solution of Irgacure 184 (BASF) as a photoradical polymerization initiator, 0.05 g of a 1 wt % cyclohexanone solution of Megafac R-40 (DIC Corporation) as a surfactant, 0.03 g of deionized water and 0.77 g of cyclohexanone, and then visually checking that dissolution had occurred.

[Comparative Example 1] Film-Forming Composition 9

A varnish (referred to below as "HB-TmDA40VF9") having a total solids concentration of 12 wt % was prepared by adding together 4.0 g of the HB-TmDA40V1 solution prepared in Production Example 1, 0.8 g of a 10 wt % cyclohexanone solution of ethoxylated glycerol triacrylate (A-GLY-20-E, 200 mPa·s; from Shin-Nakamura Chemical Co., Ltd.) and 0.24 g of a 10 wt % cyclohexanone solution of ethoxylated pentaerythritol tetraacrylate (ATM-35E, 350 mPa·s; from Shin-Nakamura Chemical Co., Ltd.) as cross-linking agents, 1.28 g of a 5 wt % cyclohexanone solution of Irgacure 184 (BASF) as a photoradical polymerization initiator, 0.04 g of a 1 wt % cyclohexanone solution of Megafac R-40 (DIC Corporation) as a surfactant, 0.07 g of deionized water and 1.64 g of cyclohexanone, and then visually checking that dissolution had occurred.

[Comparative Example 2] Film-Forming Composition 10

A varnish (referred to below as "HB-TmDA40VF10") having a total solids concentration of 12 wt % was prepared by adding together 4.0 g of the HB-TmDA40V1 solution prepared in Production Example 1, 0.8 g of a 10 wt % cyclohexanone solution of ethoxylated glycerol triacrylate (A-GLY-20-E, 200 mPa·s; from Shin-Nakamura Chemical Co., Ltd.) and 0.24 g of a 10 wt % cyclohexanone solution of ethoxylated pentaerythritol tetraacrylate (ATM-35E, 350 mPa·s; from Shin-Nakamura Chemical Co., Ltd.) as cross-linking agents, 0.4 g of a 10 wt % cyclohexanone solution of Tinuvin 460 (BASF) as an ultraviolet absorber, 1.28 g of a 5 wt % cyclohexanone solution of Irgacure 184 (BASF) as a photoradical polymerization initiator, 0.04 g of a 1 wt % cyclohexanone solution of Megafac R-40 (DIC Corporation) as a surfactant, 0.06 g of deionized water and 1.54 g of cyclohexanone, and then visually checking that dissolution had occurred.

[Comparative Example 3] Film-Forming Composition 11

A varnish (referred to below as "HB-TmDA40VF11") having a total solids concentration of 12 wt % was prepared by adding together 4.0 g of the HB-TmDA40V1 solution prepared in Production Example 1, 0.8 g of a 10 wt % cyclohexanone solution of ethoxylated glycerol triacrylate (A-GLY-20-E, 200 mPa·s; from Shin-Nakamura Chemical Co., Ltd.) and 0.24 g of a 10 wt % cyclohexanone solution of ethoxylated pentaerythritol tetraacrylate (ATM-35E, 350 mPa·s; from Shin-Nakamura Chemical Co., Ltd.) as cross-linking agents, 0.8 g of a 10 wt % cyclohexanone solution of Tinuvin 460 (BASF) as an ultraviolet absorber, 1.28 g of a 5 wt % cyclohexanone solution of Irgacure 184 (BASF) as a photoradical polymerization initiator, 0.04 g of a 1 wt % cyclohexanone solution of Megafac R-40 (DIC Corporation) as a surfactant, 0.06 g of deionized water and 1.44 g of cyclohexanone, and then visually checking that dissolution had occurred.

[Comparative Example 4] Film-Forming Composition 12

A varnish (referred to below as "HB-TmDA40VF12") having a total solids concentration of 12 wt % was prepared by adding together 4.0 g of the HB-TmDA40V1 solution prepared in Production Example 1, 0.8 g of a 10 wt % cyclohexanone solution of ethoxylated glycerol triacrylate (A-GLY-20-E, 200 mPa·s; from Shin-Nakamura Chemical Co., Ltd.) and 0.24 g of a 10 wt % cyclohexanone solution of ethoxylated pentaerythritol tetraacrylate (ATM-35E, 350 mPa·s; from Shin-Nakamura Chemical Co., Ltd.) as cross-linking agents, 0.8 g of a 10 wt % cyclohexanone solution of Tinuvin 292 (BASF) as a light stabilizer, 1.28 g of a 5 wt % cyclohexanone solution of Irgacure 184 (BASF) as a photoradical polymerization initiator, 0.04 g of a 1 wt % cyclohexanone solution of Megafac R-40 (DIC Corporation) as a surfactant, 0.06 g of deionized water and 1.44 g of cyclohexanone, and then visually checking that dissolution had occurred.

[Comparative Example 5] Film-Forming Composition 13

A varnish (referred to below as "HB-TmDA40VF13") having a total solids concentration of 12 wt % was prepared by adding together 4.0 g of the HB-TmDA40V1 solution prepared in Production Example 1, 0.8 g of a 10 wt % cyclohexanone solution of ethoxylated glycerol triacrylate (A-GLY-20-E, 200 mPa·s; from Shin-Nakamura Chemical Co., Ltd.) and 0.24 g of a 10 wt % cyclohexanone solution of ethoxylated pentaerythritol tetraacrylate (ATM-35E, 350 mPa·s; from Shin-Nakamura Chemical Co., Ltd.) as cross-linking agents, 0.4 g of a 10 wt % cyclohexanone solution of Tinuvin 292 (BASF) as a light stabilizer, 1.28 g of a 5 wt % cyclohexanone solution of Irgacure 184 (BASF) as a photoradical polymerization initiator, 0.04 g of a 1 wt % cyclohexanone solution of Megafac R-40 (DIC Corporation) as a surfactant, 0.06 g of deionized water and 1.44 g of cyclohexanone, and then visually checking that dissolution had occurred.

[3] Cured Film Production 1

[Working Example 9] Cured Film 1

The HB-TmDA40VF1 varnish prepared in Working Example 1 was spin-coated onto a soda-lime-silica glass substrate with a spin coater at 200 rpm for 5 seconds and at 1,000 rpm for 30 seconds, and an oven was used to carry out a 3-minute bake at 130° C. The applied film was then cured with a high-pressure mercury vapor lamp at a cumulative exposure dose of 200 mJ/cm$^2$, giving a cured film.

[Working Example 10] Cured Film 2

Aside from using the HB-TmDA40VF2 varnish prepared in Working Example 2, a cured film was obtained in the same way as Working Example 9.

[Working Example 11] Cured Film 3

Aside from using the HB-TmDA40VF3 varnish prepared in Working Example 3, a cured film was obtained in the same way as in Working Example 9.

[Working Example 12] Cured Film 4

Aside from using the HB-TmDA40VF4 varnish prepared in Working Example 3, a cured film was obtained in the same way as in Working Example 9.

[Comparative Example 6] Cured Film 5

Aside from using the HB-TmDA40VF9 varnish prepared in Comparative Example 1, a cured film was obtained in the same way as in Working Example 9.

[Comparative Example 7] Cured Film 6

Aside from using the HB-TmDA40VF10 varnish prepared in Comparative Example 2, a cured film was obtained in the same way as in Working Example 9.

[Comparative Example 8] Cured Film 7

Aside from using the HB-TmDA40VF11 varnish prepared in Comparative Example 3, a cured film was obtained in the same way as in Working Example 9.

[Comparative Example 9] Cured Film 8

Aside from using the HB-TmDA40VF12 varnish prepared in Comparative Example 4, a cured film was obtained in the same way as in Working Example 9.

The refractive indices at 550 nm of the films produced in Working Examples 9 to 12 and Comparative Examples 6 to 9 were measured. The initial film thicknesses were measured, in addition to which each film was placed in a light resistance tester (0.50 W/m$^2$ (k=365 nm), black panel temperature 50° C.) and the film thicknesses after 24 hours, 48 hours and 96 hours were measured. The results are shown collectively in Table 1.

TABLE 1

|  |  | Refractive index (at 550 nm) | Film thickness (nm) | | | | Change in film thickness after 96 hours (%) |
|---|---|---|---|---|---|---|---|
|  |  |  | Initial | 24 hours | 48 hours | 96 hours |  |
| Working Example | 9 | 1.748 | 699 | 695 | 688 | 652 | −6.7 |
|  | 10 | 1.742 | 690 | 688 | 679 | 665 | −3.6 |
|  | 11 | 1.719 | 676 | 671 | 669 | 639 | −5.4 |
|  | 12 | 1.751 | 573 | — | 567 | 541 | −5.6 |

TABLE 1-continued

|  | | Refractive index (at 550 nm) | Film thickness (nm) | | | Change in film thickness after 96 hours (%) |
|---|---|---|---|---|---|---|
|  | | | Initial | 24 hours | 48 hours | 96 hours | |
| Comparative Example | 6 | 1.761 | 734 | 731 | 697 | 603 | −17.8 |
| | 7 | 1.763 | 690 | 689 | 683 | 629 | −8.8 |
| | 8 | 1.759 | 669 | 671 | 669 | 579 | −13.4 |
| | 9 | 1.747 | 681 | 673 | 672 | 602 | −11.6 |

As shown in Table 1, the cured films produced from the ultraviolet absorber and light stabilizer-containing varnishes prepared in Working Examples 1 to 4 had smaller percent changes in film thickness after 96 hours than the cured films produced from the varnishes in Comparative Examples 1 to 4 which lacked either or both an ultraviolet absorber and a light stabilizer, and thus had better weather resistances (light resistances).

Also, even though an ultraviolet absorber and a light stabilizer were both added, high refractive indices of 1.7 or more were obtained.

[4] Cured Film Production 2

[Working Example 13] Cured Film 9

The HB-TmDA40VF1 varnish prepared in Working Example 1 was diluted to a solids content of 2 wt % with cyclohexanone, then spin-coated onto a soda-lime-silica glass substrate with a spin coater at 200 rpm for 5 seconds and at 1,000 rpm for 30 seconds, and an oven was used to carry out a 3-minute bake at 130° C. The applied film was then cured with a high-pressure mercury vapor lamp at a cumulative exposure dose of 200 mJ/cm$^2$, giving a cured film.

[Working Example 14] Cured Film 10

Aside from using the HB-TmDA40VF2 varnish prepared in Working Example 2, a cured film was obtained in the same way as in Working Example 13.

[Working Example 15] Cured Film 11

Aside from using the HB-TmDA40VF3 varnish prepared in Working Example 3, a cured film was obtained in the same way as in Working Example 13.

[Working Example 16] Cured Film 12

Aside from using the HB-TmDA40VF4 varnish prepared in Working Example 4, a cured film was obtained in the same way as in Working Example 13.

[Working Example 17] Cured Film 13

Aside from using the HB-TmDA40VF5 varnish prepared in Working Example 5, a cured film was obtained in the same way as in Working Example 13.

[Working Example 18] Cured Film 14

Aside from using the HB-TmDA40VF6 varnish prepared in Working Example 6, a cured film was obtained in the same way as in Working Example 13.

[Working Example 19] Cured Film 15

Aside from using the HB-TmDA40VF7 varnish prepared in Working Example 7, a cured film was obtained in the same way as in Working Example 13.

[Working Example 20] Cured Film 16

Aside from using the HB-TmDA40VF8 varnish prepared in Working Example 8, a cured film was obtained in the same way as in Working Example 13.

[Comparative Example 10] Cured Film 17

Aside from using the HB-TmDA40VF9 varnish prepared in Comparative Example 1, a cured film was obtained in the same way as in Working Example 13.

[Comparative Example 11] Cured Film 18

Aside from using the HB-TmDA40VF10 varnish prepared in Comparative Example 2, a cured film was obtained in the same way as in Working Example 13.

[Comparative Example 12] Cured Film 19

Aside from using the HB-TmDA40VF11 varnish prepared in Comparative Example 3, a cured film was obtained in the same way as in Working Example 13.

[Comparative Example 13] Cured Film 20

Aside from using the HB-TmDA40VF12 varnish prepared in Comparative Example 4, a cured film was obtained in the same way as in Working Example 13.

[Comparative Example 14] Cured Film 21

Aside from using the HB-TmDA40VF13 varnish prepared in Comparative Example 5, a cured film was obtained in the same way as in Working Example 13.

The refractive indices at 550 nm of the films produced in Working Examples 13 to 20 and Comparative Examples 10 to 14 were measured. The initial film thicknesses were measured, in addition to which each film was placed in a light resistance tester (0.50 W/m$^2$ ($\lambda$=365 nm), black panel temperature 50° C.) and the film thicknesses after 23 hours and 69 hours were measured. The results are shown collectively in Table 2.

TABLE 2

|  |  | HALS/UVA (weight ratio) | Amount of UVA/HALS addition (phr) | Refractive index (at 550 nm) | Film thickness (nm) Initial | Film thickness (nm) 23 hours | Film thickness (nm) 69 hours | Change in film thickness after 69 hours (%) |
|---|---|---|---|---|---|---|---|---|
| Working Example | 13 | 1/1 | 10 | 1.765 | 50 | 51 | 27 | −46 |
|  | 14 | 2/1 | 15 | 1.760 | 47 | 47 | 44 | −6 |
|  | 15 | 4/1 | 25 | 1.754 | 50 | 49 | 37 | −26 |
|  | 16 | 2/1 | 15 | 1.752 | 57 | 54 | 51 | −11 |
|  | 17 | 1/5 | 6 | 1.781 | 50 | 51 | 26 | −48 |
|  | 18 | 1/1 | 20 | 1.742 | 50 | 49 | 29 | −42 |
|  | 19 | 1/2 | 30 | 1.743 | 50 | — | 43 | −14 |
|  | 20 | 1/4 | 50 | 1.706 | 40 | — | 29 | −28 |
| Comparative Example | 10 |  | 0 | 1.778 | 49 | 49 | 25 | −49 |
|  | 11 |  | 5 (UVA) | 1.773 | 50 | 49 | 27 | −46 |
|  | 12 |  | 10 (UVA) | 1.769 | 49 | 49 | 25 | −49 |
|  | 13 |  | 10 (HALS) | 1.756 | 50 | 53 | 31 | −38 |
|  | 14 |  | 5 (HALS) | 1.770 | 53 | 53 | 26 | −51 |

As shown in Table 2, it is apparent that in thin-films having a thickness of 50 nm, at HALS/UVA ratios of 2/1 to 4/1 representing a surplus of light stabilizer (Working Examples 14 to 16), a good film loss suppressing effect is achieved while holding down the combined amount of light stabilizer and ultraviolet absorber added.

The invention claimed is:

1. A film-forming composition characterized by comprising a triazine ring-containing polymer which includes a recurring unit structure of formula (1) below

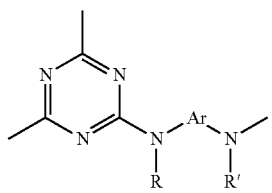

(1)

wherein R and R' are each independently a hydrogen atom, an alkyl group, an alkoxy group, an aryl group or an aralkyl group; and Ar is at least one moiety selected from the group consisting of moieties of formulas (2) to (13) below

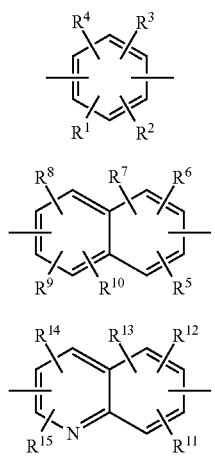

(2)

(3)

(4)

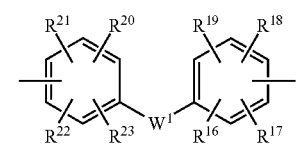

(5)

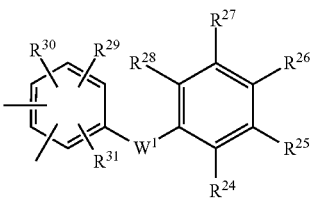

(6)

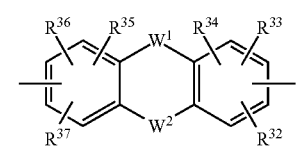

(7)

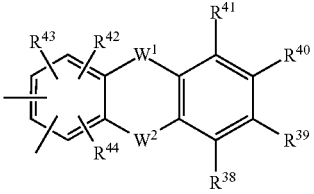

(8)

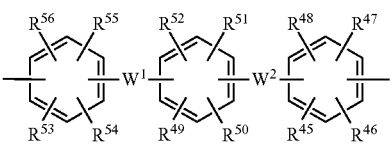

(9)

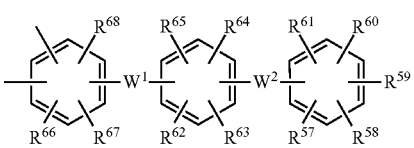

(10)

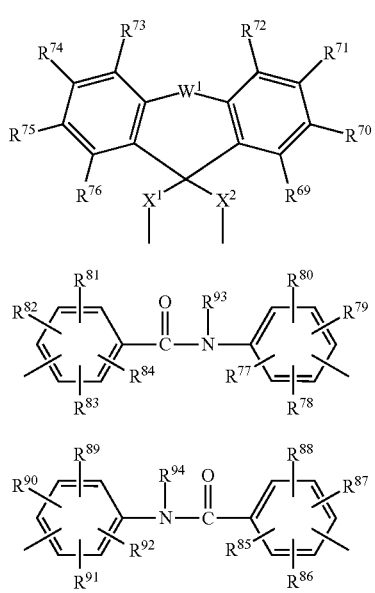

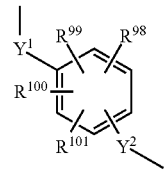

in which $R^1$ to $R^{92}$ are each independently a hydrogen atom, a halogen atom, a carboxyl group, a sulfo group, a straight chain or branched chain alkyl group of 1 to 10 carbon atoms, or a straight chain or branched chain alkoxy group of 1 to 10 carbon atoms; $R^{93}$ and $R^{94}$ are hydrogen atoms or straight chain or branched chain alkyl groups of 1 to 10 carbon atoms; $W^1$ and $W^2$ are each independently a single bond or $CR^{95}R^{96}$, with $R^{95}$ and $R^{96}$ being each independently a hydrogen atom or a straight chain or branched chain alkyl group of 1 to 10 carbon atoms, with the proviso that $R^{95}$ and $R^{96}$ may together form a ring, C=O, S, SO, $SO_2$ or $NR^{97}$, with $R^{97}$ being a hydrogen atom or a straight chain or branched chain alkyl group of 1 to 10 carbon atoms); and $X^1$ and $X^2$ are each independently a single bond, a straight chain or branched chain alkylene group of 1 to 10 carbon atoms, or a group of formula (14) below $R^{98}$ to $R^{101}$ being each independently a hydrogen atom, a halogen atom, a carboxyl group, a sulfo group, a straight chain or branched chain alkyl group of 1 to 10 carbon atoms, or a straight chain or branched chain alkoxy group of 1 to 10 carbon atoms; and $Y^1$ and $Y^2$ being each independently a single bond or a straight chain or branched chain alkylene group of 1 to 10 carbon atoms, a crosslinking agent, and an ultraviolet absorber and a light stabilizer, wherein the ultraviolet absorber and the light stabilizer are included in a weight ratio, expressed as light stabilizer/UV absorber, of from 50/50 to 80/20.

2. The film-forming composition of claim 1, wherein the ultraviolet absorber and the light stabilizer are included in a weight ratio, expressed as light stabilizer/UV absorber, of from 2/1 to 4/1.

3. The film-forming composition of claim 1 or 2, wherein the ultraviolet absorber is a triazine or benzotriazole-type ultraviolet absorber.

4. The film-forming composition of claim 3, wherein the ultraviolet absorber is a triazine-type ultraviolet absorber.

5. The film-forming composition of claim 1, wherein the light stabilizer is a hindered amine-type light stabilizer.

6. The film-forming composition of claim 1, wherein
an amount of the ultraviolet absorber is 5 to 100 parts by weight per 100 parts by weight of the triazine ring-containing polymer, and
an amount of the light stabilizer is 5 to 100 parts by weight per 100 parts by weight of the triazine ring-containing polymer.

* * * * *